(12) United States Patent
Usman et al.

(10) Patent No.: US 11,886,195 B2
(45) Date of Patent: Jan. 30, 2024

(54) ACTIVE LEARNING AND VALIDATION SYSTEM FOR VEHICLES

(71) Applicant: Woven by Toyota, U.S., Inc., Palo Alto, CA (US)

(72) Inventors: Muhammad Usman, Sunnyvale, CA (US); Sammy Omari, Los Altos, CA (US); Moritz Niendorf, San Francisco, CA (US); Sameer Qureshi, Sunnyvale, CA (US); Alan Agon, Sunnyvale, CA (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 428 days.

(21) Appl. No.: 17/107,947

(22) Filed: Nov. 30, 2020

(65) Prior Publication Data

US 2022/0171401 A1 Jun. 2, 2022

(51) Int. Cl.
*B60W 40/09* (2012.01)
*G05D 1/02* (2020.01)
*G05D 1/00* (2006.01)

(52) U.S. Cl.
CPC ......... *G05D 1/0221* (2013.01); *G05D 1/0088* (2013.01); *G05D 1/0214* (2013.01); *G05D 2201/0213* (2013.01)

(58) Field of Classification Search
CPC .. G05D 1/0221; G05D 1/0088; G05D 1/0214; G05D 2201/0213
See application file for complete search history.

(56) References Cited

U.S. PATENT DOCUMENTS

| | | | |
|---|---|---|---|
| 11,415,994 B2* | 8/2022 | Fu | G08G 1/0133 |
| 11,506,510 B1* | 11/2022 | Wang | G01C 21/365 |
| 2018/0362031 A1* | 12/2018 | Chang | G07C 5/008 |
| 2019/0310627 A1* | 10/2019 | Halder | G05D 1/0033 |
| 2020/0339151 A1* | 10/2020 | Batts | B60W 60/001 |
| 2022/0230536 A1* | 7/2022 | Tkachenko | G08G 1/0129 |

* cited by examiner

*Primary Examiner* — Adam R Mott
*Assistant Examiner* — Mohammed Yousef Abuelhawa
(74) *Attorney, Agent, or Firm* — Christopher G. Darrow; Darrow Mustafa PC

(57) ABSTRACT

A method includes generating a parameter of a trajectory associated with a scenario using a path planner. The parameter is generated based on a training dataset. The method includes comparing the parameter of the trajectory against a validation parameter associated with a validation dataset. The validation parameter is based on human-based vehicle driving trajectory data associated with scenarios that satisfy a level of similarity with the scenario. The method further includes determining a level of similarity between the parameter associated with the scenario and the validation parameter associated with the scenarios, and, subsequent to determining that the level of similarity fails to satisfy a similarity threshold, the method concludes with providing training data associated with the scenario to the training dataset so that a subsequent parameter of a subsequent trajectory generated by the path planner and associated with the scenario satisfies the level of similarity against the validation parameter.

17 Claims, 8 Drawing Sheets

ACTIVE LEARNING AND VALIDATION SYSTEM FOR VEHICLES

TECHNICAL FIELD

This disclosure relates generally to an autonomous or semi-autonomous driving system and, more specifically, to an active learning and validation system for vehicles.

BACKGROUND

Trajectory planner systems may generally include one or more systems or subsystems of autonomous or semi-autonomous vehicles that may be utilized to generate planned trajectories for allowing autonomous or semi-autonomous vehicles to safely and comfortably navigate residential and urban environments and in accordance with the local and/or regional traffic laws of the residential and urban environments. while utilizing these large aggregates of data may assist trajectory planner systems in generating accurate, safe, and comfortable planned trajectories for rudimentary driving scenarios, there may nevertheless include certain edge case driving scenarios in which typical trajectory planner systems may struggle to perform as well as human drivers would perform with respect to similar driving scenarios and/or under similar circumstances. Indeed, while such edge case driving scenarios may not be those encountered most often by the autonomous or semi-autonomous vehicle, the undesirable performance of typical trajectory planner systems with respect to these edge case driving scenarios may nevertheless lead to the autonomous or semi-autonomous vehicle operating less optimally in terms of safety, comfortability, and traffic law adherence as compared to human-driven vehicles. It may be thus useful to provide techniques to improve trajectory planning systems.

DESCRIPTION OF EXAMPLE EMBODIMENTS

Figure 1:
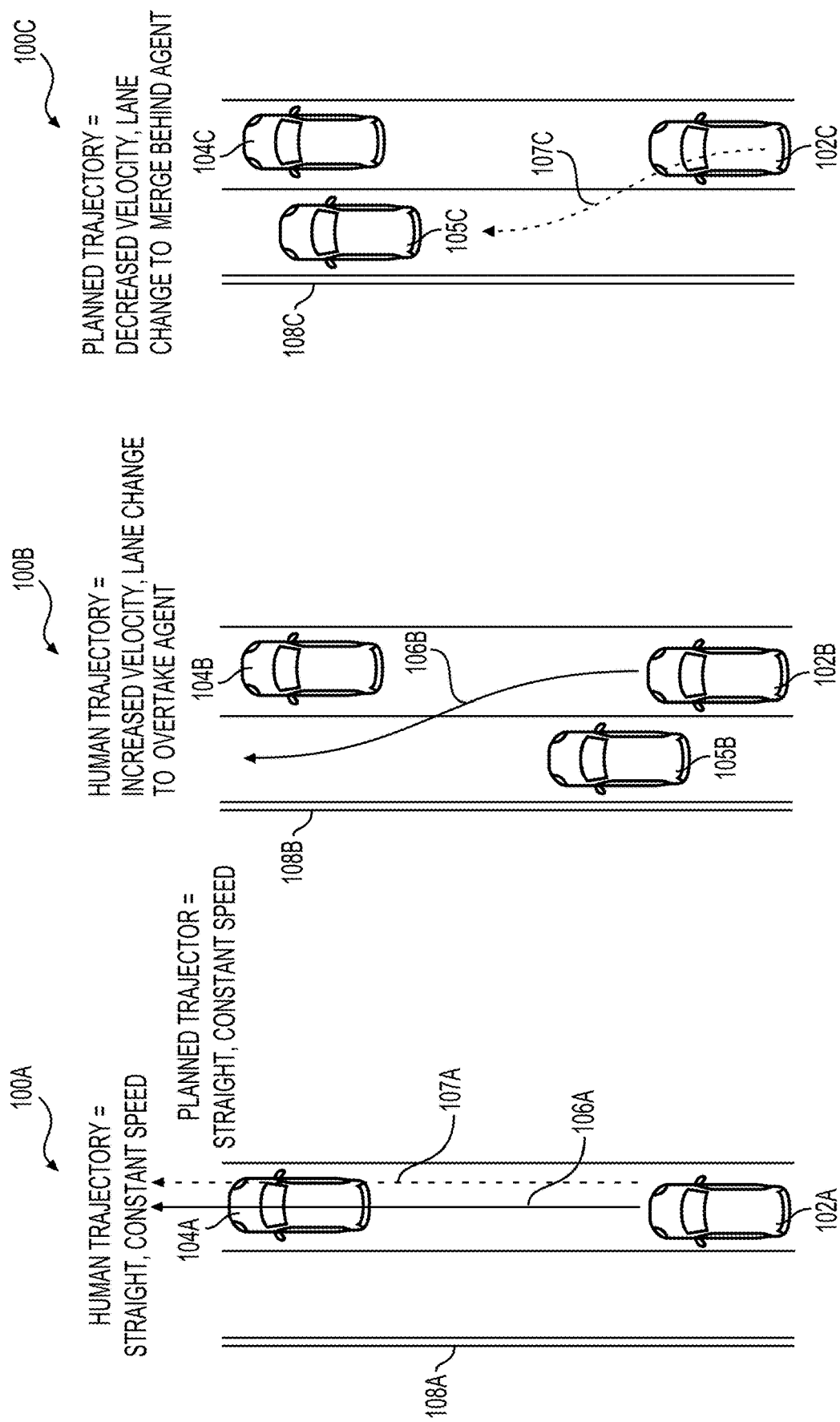
FIG. 1 illustrates one or more running examples of human trajectories and planned trajectories for driving scenarios.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

Trajectory planner systems may generally include one or more systems or subsystems of autonomous or semi-autonomous vehicles that may be utilized to generate planned trajectories for allowing autonomous or semi-autonomous vehicles to safely and comfortably navigate residential and urban environments and in accordance with the local and/or regional traffic laws of the residential and urban environments. Thus, training trajectory planner systems for maximizing efficiency and efficacy of autonomous or semi-autonomous vehicles may suitably rely upon on data collected over thousands or millions of miles driven by human drivers of the autonomous or semi-autonomous vehicles. However, while utilizing these large aggregates of data may assist trajectory planner systems in generating accurate, safe, and comfortable planned trajectories for rudimentary driving scenarios (e.g., routine lane changes, soft braking, yields during the slowing of traffic, left and right turns at light-traffic intersections, and so forth), there may nevertheless include certain edge case driving scenarios (e.g., dodging a pothole, slamming on the brakes for an unexpected pedestrian, slamming on the brakes to avoid colliding with a reckless driver, deciding the safest time to enter into a busy intersection, driving during times of stop-and-go traffic, driving especially cautiously through school zones or areas in which wildlife freely roam, exhibiting defensive driving postures, and so forth) in which typical trajectory planner systems may struggle to perform as well as human drivers would perform with respect to similar driving scenarios and/or under similar circumstances. Indeed, while such edge case driving scenarios may not be those encountered most often by the autonomous or semi-autonomous vehicle, the undesirable performance of typical trajectory planner systems with respect to these edge case driving scenarios may nevertheless lead to the autonomous or semi-autonomous vehicle operating less optimally in terms of safety, comfortability, and traffic law adherence as compared to human-driven vehicles. It may be thus useful to provide techniques to intelligently identify and flag data associated with edge case driving scenarios or examples and to utilize those data associated with the edge case driving scenarios or examples to improve trajectory planner systems.

Accordingly, the present techniques include providing one or more active-learning computing processes for intelligently identifying and flagging data associated with edge case driving scenarios or examples and utilizing those data associated with edge case driving scenarios or examples to improve the performance of a trajectory planner system, in accordance with the presently disclosed embodiments. In some embodiments, the one or more active-learning computing processes may correspond to one or more computing and analyses processes that may be performed offline (e.g., apart from the vehicle) and/or remotely from the vehicle. For example, in one embodiment, the one or more active-learning computing processes may include one or more sets of hard-coded rules provided by developers for allowing the vehicle to make informed decisions with respect to various driving scenarios. In another embodiment, the one or more active-learning computing processes may include one or more machine-learning (ML) models (e.g., supervised learning models, unsupervised learning models, deep learning models, imitation learning models, inverse reinforcement learning (IRL) models, deep neural network models, and so forth) that may be trained and learned over time based on, for example, human driving behavior, human demonstrations, human experiences, human idiosyncrasies, and so forth. This may allow the vehicle to make autonomous decisions based on the real-world driving experiences of actual human drivers. In other embodiments, the one or more active-learning computing processes may correspond to one or more computing and analyses processes that may be performed—at least in some part—online (e.g., onboard the vehicle).

In certain embodiments, the one or more active-learning computing processes may begin with generating learned parameters by way of a trajectory planner training module based on a training dataset. For example, in certain embodiments, the one or more active-learning computing processes may include providing an initial training dataset to the trajectory planner training module to learn and train the trajectory planner training module. For example, in some embodiments, the initial training dataset may include one or more large aggregates of vehicle driving data collected and accumulated over time from a fleet of vehicles deployed, for example, in a ride-sharing service, a delivery service, a rental service, a personal chauffeur service, or other similar vehicle-based driving service. Particularly, in one embodiment, the initial training dataset may include, for example, tens of thousands or hundreds of thousands of human driving sample data collected over thousands or millions of miles human driving experiences. In certain embodiments, the set of learned parameters generated based on the initial training dataset may include, for example, a set of values, metrics, functions, hyperparameters, weights, vectors, and/ or gradients that may be most suitable for the parameterization, optimization, and configuration of the trajectory planner training module with respect to the initial training dataset.

In certain embodiments, the one or more active-learning computing processes may then continue with validating and evaluating trained and learned trajectory planner validation module against a validation dataset. For example, in certain embodiments, the validation dataset may include vehicle environment data and human-based vehicle driving data, in which the human-based vehicle driving data may correspond to, for example, observed driving operations performed by a human driver in an environment corresponding to the vehicle environment data. In one embodiment, the validation dataset may include vehicle environment data and the associated human-based vehicle driving data (e.g., one or more human-based trajectories) collected, accumulated, and associated over time based on a fleet of human-driven vehicles 102 deployed, for example, for use as part of one or more vehicle-based driving services. In another embodiment, the validation dataset may include vehicle environment data and the associated compute-based vehicle driving data collected and accumulated over time based on one or more sensors (e.g., LiDAR data, inertial measurement (IMU) data, image data, and so forth) and/or one or more dedicated sensors or other similar systems (e.g., cameras, event data recorders (EDRs), data loggers, monitors, and so forth) that may be associated with, and utilized to monitor, the autonomous driving operations and driving environments of a fleet of autonomous vehicles. In some embodiments, the validation dataset may also be updated and aggregated regularly or periodically based on additional human-based fleet vehicle driving data and/or compute-based fleet vehicle driving data that may be injected or fire hosed into the validation dataset as these additional fleet vehicle driving data become available.

In certain embodiments, the one or more active-learning computing processes may then continue with the trajectory planner validation module generating compute-based vehicle driving data by processing the validation dataset (e.g., vehicle environment data and human-based vehicle driving data) utilizing the trajectory planner validation module as configured based on the generated learned parameters. For example, in certain embodiments, based on the validation dataset (e.g., vehicle environment data and associated human-based trajectories) and the generated learned parameters (e.g., a set of values, metrics, functions, hyperparameters, weights, vectors, and/or gradients), the trajectory planner validation module may generate compute-based vehicle driving data (e.g., one or more compute-based planned driving trajectories). In certain embodiments, the one or more active-learning computing processes may then continue with the trajectory planner validation module determining whether a discrepancy between the compute-based vehicle driving data and the human-based vehicle driving data satisfies one or more predetermined criteria.

For example, in certain embodiments, the trajectory planner validation module may analyze (e.g., offline via simulation) the compute-based vehicle driving data (e.g., one or more compute-based planned trajectories) and the human-based vehicle driving data (e.g., one or more human-based trajectories) by comparing one or more predetermined parameters associated with the compute-based vehicle driving data (e.g., one or more compute-based planned trajectories) and the human-based vehicle driving data (e.g., one or more human-based trajectories) to determine one or more discrepancies. That is, the trajectory planner validation module may analyze (e.g., offline via simulation) the compute-based vehicle driving data (e.g., one or more compute-based planned trajectories) and the human-based vehicle driving data (e.g., one or more human-based trajectories) to find samples of data within the large aggregates of vehicle environment data and human-driven vehicle driving data that correspond to specific driving scenarios or examples in which one or more driving parameters associated with the planned trajectory are markedly different (e.g., based on a threshold or some predetermined criteria) from those same parameters associated with the human trajectory for the same or similar driving scenarios or examples.

For example, in some embodiments, the trajectory planner validation module may determine discrepancies between the compute-based vehicle driving data (e.g., one or more compute-based planned trajectories) and the human-based vehicle driving data (e.g., one or more human-based trajectories) by comparing one or more of, for example, velocity parameters, acceleration parameters, braking parameters, steering angle parameters, jerk parameters, average distance parameters, lateral acceleration parameters, spatiotemporal overlap parameters, average violation of traffic laws parameters, gap selection parameters, disengagement parameters, progress in the route parameters, parameters expressing a proportion of driving scenarios in which the trajectory planner system selects a different behavior as compared to a human driver, latitudinal distance parameters, longitudinal distance parameters, a ride smoothness parameters, and so forth. In certain embodiments, the aforementioned driving parameters may be used to derive one or evaluation criteria that may be utilized to evaluate the planned trajectories generated by the trajectory planner training module. For example, in some embodiments, the derived evaluation criteria may include, for example, a similarity to human driving score, a legality score, a passenger comfort score, a disengagement score, a fuel range score, a collision score, or any of various or other evaluation criteria that may be utilized to evaluate and score the planned trajectories generated by the generated by the trajectory planner training module. In some embodiments, a degree of severity for the determined discrepancies may also be determined based on, for example, a measure of an amount of variation between the driving parameters associated the compute-based planned trajectories and the driving parameters associated with the human-based trajectories.

In certain embodiments, in response to determining the discrepancies between the compute-based vehicle driving data (e.g., one or more compute-based planned trajectories) and the human-based vehicle driving data (e.g., one or more human-based trajectories), the one or more active-learning computing processes may then continue with the trajectory planner validation module flagging one or more of the parameters associated with the planned trajectories corresponding to the determined discrepancies and generating a retraining dataset (e.g., corresponding to edge case driving scenarios or examples in which trajectory planning training module is determined to have performed undesirably with respect to the human-based vehicle driving data) based on the vehicle environment data and the human-based vehicle driving data corresponding to the determined discrepancies.

For example, in certain embodiments, the retraining dataset may include the identified edge case driving scenarios or examples in which trajectory planning training module is determined to have performed undesirably with respect to the human-based vehicle driving data corresponding to the determined discrepancies, as well as one or more of the parameters associated with the planned trajectory corresponding to the determined discrepancies. In certain embodiments, the retraining dataset (e.g., corresponding to edge case driving scenarios or examples in which trajectory planning training module is determined to have performed undesirably with to the human-based vehicle driving data) may be fed back into the initial training dataset for the trajectory planning training module, indicating one or more driving scenarios or examples in which the trajectory planning training module fails to perform as well as human-driven vehicles.

In this way, the one or more active-learning computing processes may intelligently identify and flag driving data associated with driving scenarios or examples in which the trajectory planning training module underperforms as compared to human-driven vehicles and utilize those driving data associated with the driving scenarios or examples to iteratively retrain the trajectory planning training module over time. Thus, the present techniques may improve the performance, efficiency, and efficacy of the trajectory planner system over time, as the training and retraining of the trajectory planner systems are based on training data including human-based driving data (e.g., human-based driving data collected from a fleet of vehicles utilized in vehicle-based driving services) and the identified and flagged driving data associated with the driving scenarios or examples in which the trajectory planner system underperforms as compared to human-driven vehicles. Indeed, in this manner, the trajectory planner system may be trained and learned based on a vast array of human driving examples (e.g., tens of thousands or hundreds of thousands of samples of real-world human-driven trajectories at scale) being iteratively fed back into the initial training dataset to iteratively train and retrain the trajectory planner system to identify and flag driving data associated with edge case human-driving scenarios (e.g., long-tailed driving experiences) and utilize those driving data to learn and emulate the driving behavior of human drivers for the same or similar driving scenarios or examples. Moreover, because the one or more active-learning computing processes may be performed offline, the training and retraining of the trajectory planner system may be scaled and shared across an entire fleet of autonomous or semi-autonomous vehicles.

As used herein, a "routine driving scenario" may refer to a relatively simple, everyday driving scenario in which an autonomous vehicle, semi-autonomous vehicle, or human-driven vehicle may readily encounter (e.g., routine lane changes, soft braking, yields during the slowing of traffic, left and right turns at light-traffic intersections, and so forth), and thus aggregate driving data collected over hundreds or thousands of miles may include a large dataset for the "routine driving scenarios." Furthermore, as used herein, a "complex driving scenario" may refer to certain edge case driving scenarios (e.g., dodging a pothole, slamming on the brakes for an unexpected pedestrian, slamming on the brakes to avoid colliding with a reckless driver, deciding the safest time to enter into a busy intersection, driving during times of stop-and-go traffic, driving especially cautiously through school zones or areas in which wildlife freely roam, exhibiting defensive driving postures, and so forth), and thus the aggregate driving data collected over hundreds or thousands of miles may include only a minimal dataset for the "complex driving scenarios" and typical trajectory planner systems may struggle to perform as well as human drivers would perform with respect to the "complex driving scenarios".

FIG. 1 illustrates one or more running examples of driving scenarios 100A, 100B, and 100C in which human trajectories 106A and 106B may be compared against planned trajectories 107A and 107C for each of the vehicles 102A, 102B, and 102C, in accordance with the presently disclosed embodiments. For example, referring first to driving scenario 100A, the driving scenario 100A illustrates a routine driving scenario in which the vehicle 102A may travel straight and at a constant velocity within the same lane of a roadway 108A in which an agent 104A is traveling straight and at a constant velocity. As illustrated, because this is a routine driving scenario, both the human trajectory 106A and the planned trajectory 107A include a constant steering angle and a constant velocity as the vehicle 102A travels along the roadway 108A. each of the example driving scenarios 100A, 100B, and 100C illustrates the planned trajectories 306A, 306B, and 306C for the vehicles 102A, 102B, and 102C as the vehicles 102A, 102B, and 102C travel along roadways 302A, 302B, and 302C.

In certain embodiments, referring now to driving scenario 100B, the driving scenario 100B illustrates a complex driving scenario in which the vehicle 102B may include a human trajectory 106B. The human trajectory 106B may lead the vehicle 102B to travel straight and at an increasing velocity within the same lane of the roadway 108B in which the agent 104B is traveling straight and at a constant velocity. In the opposite lane of the roadway 108B in which the vehicle 102B is attempting to merge, another agent 105B may be traveling straight and a constant velocity, such that because the human trajectory 106B includes an increasing velocity as compared to the constant velocities of the agents 104B and 105B, the vehicle 102B may execute a lane merger/lane change at some point in time to overtake the agent 105B. In contrast to the driving scenario 100B, the driving scenario 100C illustrates another complex driving scenario in which the vehicle 102C may include a planned trajectory 107C. The planned trajectory 107C may lead the vehicle 102C to travel straight and at a decreasing velocity within the same lane of the roadway 108C in which the agent 104C is traveling straight and at a constant velocity. In the opposite lane of the roadway 108C in which the vehicle 102C is attempting to merge, another agent 105C may be traveling straight and a constant velocity. Because the planned trajectory 107C includes a decreasing velocity (e.g., to a near stop) as compared to the constant velocities of the agents 104B and 105B, the vehicle 102B may decrease its velocity to a near stop, allowing the vehicle 102C to execute a lane merger/lane change at some point in time to merge behind the agent 105C.

Thus, as the forgoing illustrates, in certain embodiments, the planner module may generate accurate, safe, and comfortable planned trajectories 107A that are similar to human trajectories 106A for routine driving scenarios (e.g., driving straight on a straight roadway 108A and at constant velocity), but may not perform as well as the human trajectories 106B for more complex driving scenarios (e.g., driving at an increasing velocity in which an agent 104B is before the vehicle 102B traveling at a constant velocity and another agent 105B is traveling at a constant velocity alongside the vehicle 102B at which the vehicle 102B is attempting to perform a lane merger/lane change). Specifically, in some embodiments, the planner module may be trained, for example, utilizing vehicle driving data collected and accumulated over thousands or millions of miles driven by human drivers of vehicles 102. Thus, because vehicle driving data corresponding to routine driving scenarios may be the most prodigious of the vehicle driving data collected and accumulated over thousands or millions of miles, the planner module may perform excellently in generating accurate, safe, and comfortable planned trajectories that emulate human driving behavior, such as the planned trajectory 107A as compared to the human trajectory 106A.

However, in some embodiments, a subset of the vehicle driving data collected and accumulated may correspond to certain edge case driving scenarios (e.g., complex driving scenarios, such as dodging a pothole, slamming on the brakes for an unexpected pedestrian, slamming on the brakes to avoid colliding with a reckless driver, deciding the safest time to enter into a busy intersection, driving during times of stop-and-go traffic, driving especially cautiously through school zones or areas in which wildlife freely roam, and so forth) in which the planner module may struggle to perform as well as human drivers perform or would perform with respect to similar driving scenarios and in similar vehicle environments. This may lead to the vehicle 102 operating less optimally in terms of safety, comfortability, and traffic law adherence as compared to human-driven vehicles 102. Specifically, as previously noted, the planning module may not perform well for complex driving scenarios (e.g., edge case scenarios) well because of, for example, lack of vehicle data collected, lack of in-vehicle driven miles, and/or lack of granular understanding of what those edge-case driving scenarios include because the planning module or autonomy stack may be untrained on how to accurately identify such complex driving scenarios (e.g., edge case driving scenario). It may be thus useful to provide techniques to intelligently identify and flag data associated with edge case driving scenarios or examples and to utilize those data associated with edge case driving scenarios or examples to improve the performance of the planner module 208 with respect to human driving behavior.

Figure 2:
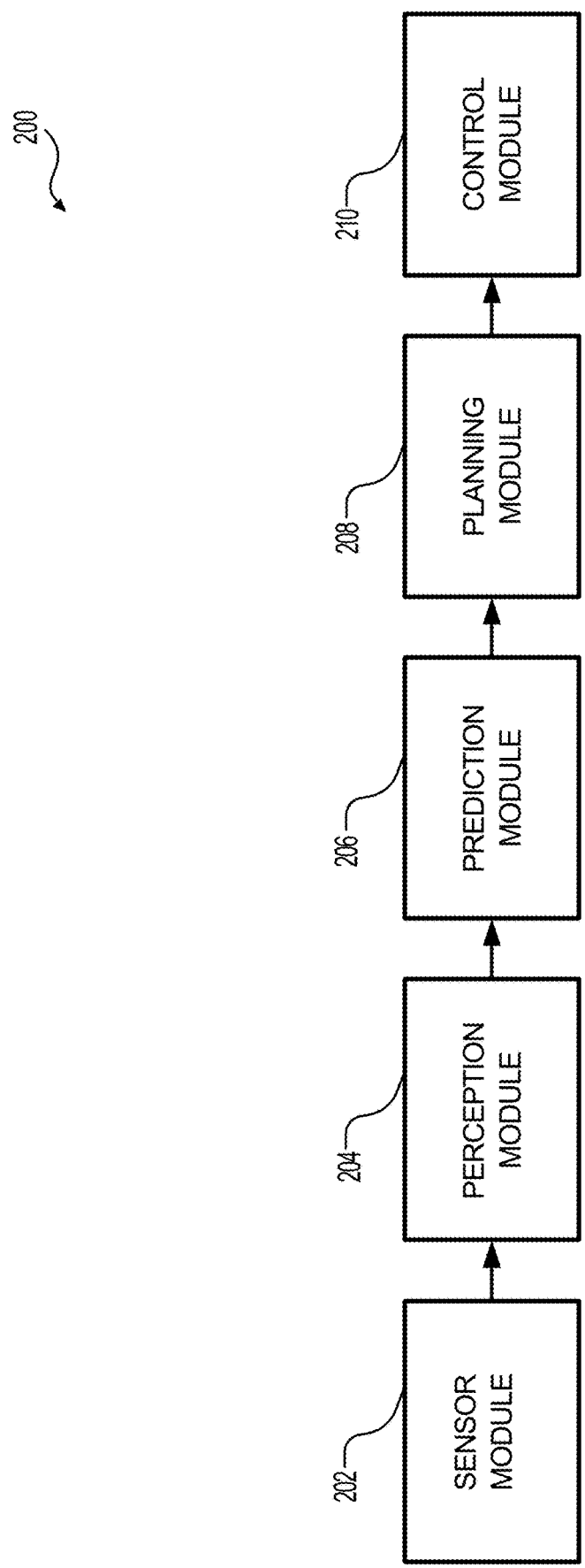
FIG. 2 illustrates an example block diagram of a compute system of an autonomous or semi-autonomous vehicle.

FIG. 2 illustrates an example block diagram of a compute system 200 configured for operating a vehicle in autonomous-driving mode or semi-autonomous mode, in accordance with the presently disclosed embodiments. For example, as depicted by FIG. 2, in some embodiments, the compute system 200 may include a number of computing modules, such as a sensor data module 202, a perception module 204, a prediction module 206, a planning module 208, and a control module 210.

The sensor data module 202 may obtain and pre-process sensor/telemetry data. Such data may be captured by any suitable sensors of the vehicle 102. In certain embodiments, the vehicle 102 may include, for example, one or more LiDAR sensors that may be utilized to transmit pulsed laser beams in multiple directions and measure the reflected signal from agents 104, 105 or other objects surrounding the vehicle 102. The time of flight (ToF) of the light signals may be used to measure the distance or depth of the agents 104, 105 or other objects from the LiDAR. In some embodiments, the vehicle 102 may include optical cameras pointing in different directions to capture images (e.g., still images, video images) of the surrounding of the vehicle 102. In certain embodiments, radars may also be used by the vehicle 102 for detecting other vehicles and/or other potential obstructions at a distance. As further examples, the vehicle 102 may be equipped with, for example, one or more ultrasonic sensors, electromagnetic imaging sensors, or thermal imaging sensors for close range object detection (e.g., parking and obstacle detection). The vehicle 102 may further include one or more infrared cameras for object detection when operating within, for example, low-lighting and/or dark locations. In certain embodiments, sensor data module 202 may suppress noise in the sensor data or normalize the sensor data. The sensor module 202 may be configured to receive sensor information from any suitable sensors and/or modules configured to sense information from the environment surrounding the vehicle 102.

In certain embodiments, the perception module 204 may be suitable for correlating and fusing the data from the different types of sensors of the sensor module 202 to model the contextual environment of the vehicle 102. The perception module 204 may utilize information extracted by multiple independent sensors to provide information that would not be available from any single type of sensors. In some embodiments, combining data from multiple sensor types allows the perception module 204 to leverage the strengths of different sensors and more accurately and precisely perceive the environment. For example, image-based object recognition may not work well in low-light conditions. This may be compensated by sensor data from LiDAR or radar, which are effective sensors for measuring distances to targets in low-light conditions. For example, image-based object recognition may mistakenly determine that an object depicted in a poster is an actual three-dimensional (3D) object in the environment. However, if depth information from a LiDAR is also available, the perception module 204 may utilize that additional information to correctly determine that the object in the poster is actually a two-dimensional (2D) object, for example.

In certain embodiments, the perception module 204 may process the available data (e.g., sensor data, data from a high-definition map, and so forth) to derive information about the contextual environment. For example, perception module 204 may include one or more agent modelers (e.g., object detectors, object classifiers, or machine-learning (ML) models trained to derive information from the sensor data) to detect and/or classify agents 104, 105 present in the environment of the vehicle 102 (e.g., other vehicles 102, pedestrians, bicyclists, wildlife, vegetation, or any of various other moving and/or stationary objects). The perception module 204 may also determine various characteristics of the agents 104, 105. For example, perception module 204 may track the velocities, moving directions, accelerations, trajectories, relative distances, or relative positions of these agents 104, 105. In certain embodiments, the perception module 204 may also leverage information from a high-definition map. The high-definition map may include, for example, a precise 3D model of the environment, including buildings, curbs, street signs, traffic lights, and any stationary fixtures in the environment. In certain embodiments, GPS data and/or image-based localization techniques (e.g., simultaneous localization and mapping, or SLAM), the perception module 204 may determine the pose (e.g., position and orientation) of the vehicle 102 or the poses of the sensors of the vehicle 102 within the high-definition map. The pose information, in turn, may be used by the perception module 204 to query the high-definition map and determine what agents 104, 105 are expected to be in the environment.

In certain embodiments, perception module 204 may utilize the sensor data from one or more types of sensors and/or information derived therefrom to generate a representation of the contextual environment of the vehicle 102. For example, the representation of the external environment may include agents 104, 105 such as other vehicles 102, curbs, debris, objects, and pedestrians. The contextual representation may be limited to a maximum range of the sensor array (e.g., 50 meters, 100 meters, or 200 meters) or may be supplemented by information obtained from other sensors in the environment, semantic information known about an area, and/or any other relevant information regardless of the range of the sensor array. The representation of the contextual environment may include information about the agents 104, 105 or other objects within the environment that may be surrounding the vehicle 102, as well as semantic information about the traffic lanes, traffic rules, traffic signs, time of day, weather, and/or any other suitable information. The contextual environment may be represented in any suitable manner. For example, the contextual representation may be encoded as a vector or matrix of numerical values, with each value in the vector/matrix corresponding to a predetermined category of information.

In certain embodiments, the representation of the present contextual environment from the perception module 204 may be consumed by a prediction module 206 to generate one or more predictions of the future environment. For example, given a representation of the contextual environment at time $T_0$, the prediction module 206 may output another contextual representation for time $T_1$. For instance, if the $T_0$ contextual environment may be represented by a raster image, the output of the prediction module 206 may be another raster image (e.g., a snapshot of the current environment) that depicts where the agents 104, 105 would be at time $T_1$ (e.g., a snapshot of the predicted future). In certain embodiments, prediction module 206 may include a ML model that may be trained based on previously recorded contextual and sensor data. For example, one training sample may be generated based on a sequence of actual sensor data captured by the vehicle 102 at times $T_0$ and $T_1$. The captured data at times $T_0$ and $T_1$ may be used to generate, respectively, a first contextual representation (the training data) and a second contextual representation (the associated ground-truth used for training). During training, the ML model may process the first contextual representation using the model's current configuration parameters and output a predicted contextual representation. The predicted contextual representation may then be compared to the known second contextual representation (e.g., the ground-truth at time $T_1$).

In certain embodiments, the comparison may be quantified by a loss value, computed using a loss function. The loss value may be used (e.g., via back-propagation techniques) to update the configuration parameters of the ML model so that the loss would be less if the prediction were to be made again. The ML model may be trained iteratively using a large set of training samples until a convergence or termination condition is met. For example, training may terminate when the loss value is below a predetermined threshold. Once trained, the ML model may be used to generate predictions of future contextual representations based on current contextual representations. The prediction module 206 may utilize any combination of rule-based, ML-based, and/or mechanics models for characterizing the movement of agents 104, 105 over time in order to predict the probabilities of different paths, types of movement, and actions over different time periods for use by the system to predict the movements of agents 104, 105 surrounding the vehicle 102.

In certain embodiments, the planning module 208 may determine a planned trajectory for the vehicle 102, including navigation routes and particular driving operations (e.g., slowing down, speeding up, stopping, left and right turns, swerving, and so forth), based on the predicted contextual representation generated by the prediction module 206. In certain embodiments, the planning module 208 may utilize the predicted information encoded within the predicted contextual representation (e.g., predicted location or trajectory of agents 104, 105, semantic data, and so forth) and any other available information (e.g., map data, scenario information, traffic data, accident reports, weather reports, target destinations, and any other suitable information) to determine one or more actions, goals, or navigation instructions for the vehicle 102 over a window of time (e.g., the planned trajectory may be for the next 2, 5, 10, or 15 seconds). For example, based on the predicted behavior of the agents 104, 105 surrounding the vehicle and the traffic data to a particular destination, the planning module 208 may determine a particular navigation path and associated driving operations for the vehicle 102 over a window of time. The path may include a series of waypoints and/or any other suitable set of information for the vehicle 102 to understand the path of movement to following. The path and associated driving operations are generated to avoid possible collisions with one or more agents 104, 105, to follow the rules of the road, and to ensure a safe and comfortable ride for the passengers of the vehicle 102.

In certain embodiments, planning module 208 may generate, based on a given predicted contextual representation, several different planned trajectories (e.g., paths, goals or navigation instructions) for the vehicle 102. For each plan, the planning module 208 may compute a score that represents the desirability of that plan. For example, if the plan would likely result in the vehicle 102 performing a hard stop or otherwise performing an uncomfortable or jarring movement the score for the plan may be penalized accordingly. Another plan that would cause the vehicle 102 to violate traffic rules or take a lengthy detour to avoid possible collisions may also have a score that is penalized, but the penalty may be less severe than the penalty applied. The penalties and scoring of the different potential routes may ensure safe and comfortable paths are generated and selected by the system. For example, a third plan that causes the vehicle 102 to gradually stop or change lanes to avoid an agent 104, 105 in the predicted future may receive the highest score compared to paths with jarring movements and/or an increased chance of a collision event. Based on the assigned scores for the plans, the planning module 208 may select the best planned trajectory to carry out. While the example above used collision as an example, the disclosure herein contemplates the use of any suitable scoring criterial, such as travel distance or time, fuel economy, changes to the estimated time of arrival at the destination, passenger comfort, proximity to other vehicles, the confidence score associated with the predicted contextual representation, and so forth.

Based on the planned trajectory generated by planning module 208, which may include one or more navigation path or associated driving operations, the control module 210 may determine the specific commands to be issued to the actuators of the vehicle 102. The actuators of the vehicle 102 are components that are responsible for moving and controlling the vehicle 102. The actuators control driving functions of the vehicle 102, such as for example, steering, turn signals, throttle, deceleration (e.g., braking), acceleration, gear shift, and so forth. For example, control module 210 may transmit commands to a steering actuator to maintain a particular steering angle for a particular amount of time to move a vehicle on a particular trajectory. As another example, control module 210 may transmit commands to a throttle actuator to speed the vehicle 102 up or a braking actuator to slow the vehicle 102 down. In certain embodiments, as will be further appreciated below with respect to FIGS. 3, 4, 5, and 6, it may be useful to provide one or more active-learning computing processes for training and retraining the planning module 208 offline based on vehicle environment data and human-based vehicle driving data to intelligently identify and flag data associated with driving scenarios or examples in which the planning module 208 underperforms as compared to human-driven vehicles 102 and utilize those data associated with the driving scenarios or examples to iteratively retrain the planning module 208 over time.

Figure 3:
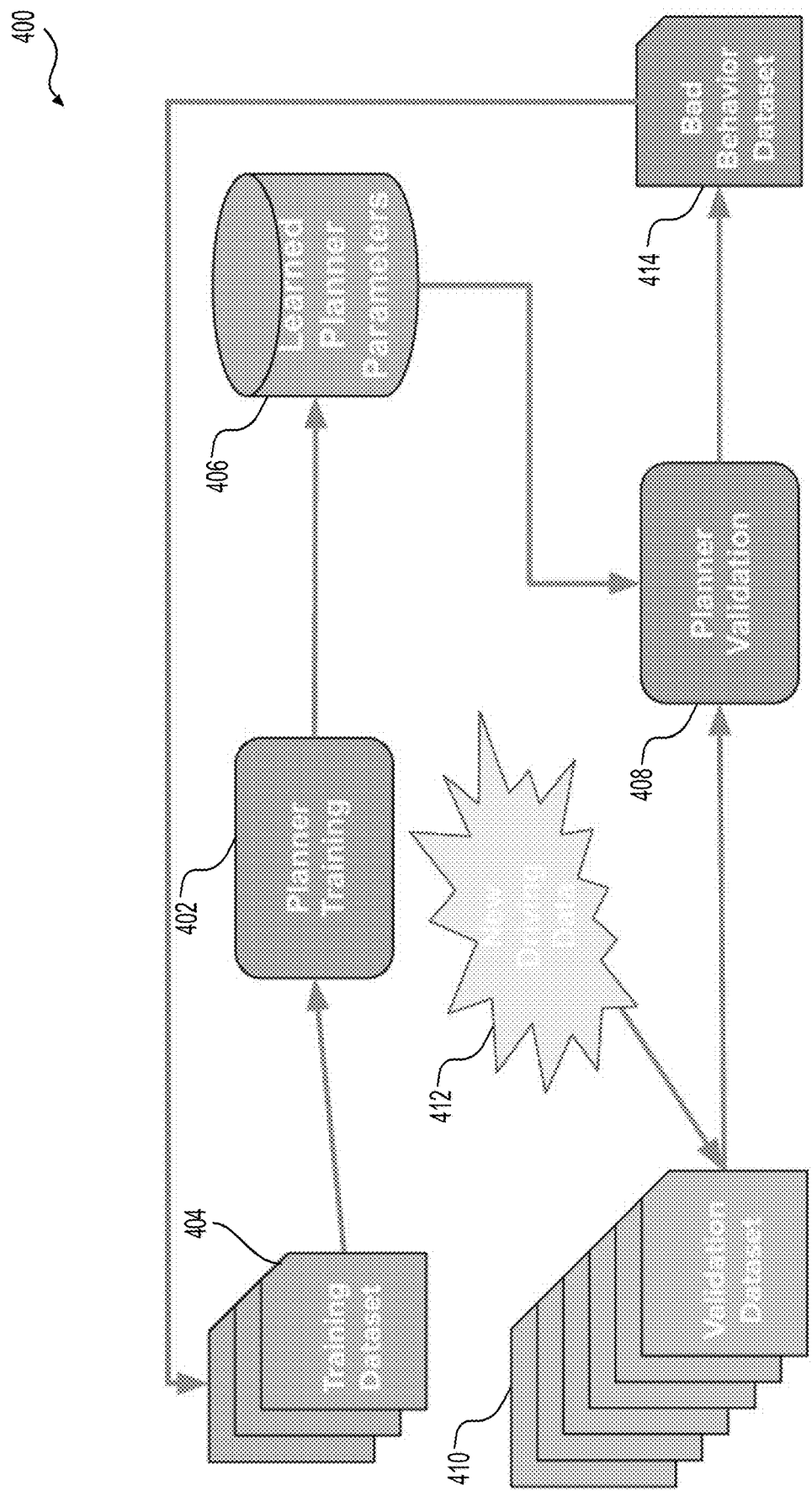
FIG. 3 illustrates an example block diagram of one or more active-learning computing processes for intelligently identifying and flagging data associated with edge case driving scenarios or examples.

Turning now to FIG. 3, which illustrates an example block diagram of one or more active-learning computing processes 400 for intelligently identifying and flagging data associated with edge case driving scenarios or examples and utilizing those data associated with edge case driving scenarios or examples to improve the performance of a trajectory planner system, in accordance with the presently disclosed embodiments. In some embodiments, the one or more active-learning computing processes 400 may correspond to one or more computing and analyses processes that may be performed offline (e.g., apart from the vehicle 102) and remotely from the vehicle 102. For example, in one embodiment, the one or more active-learning computing processes 400 may include one or more sets of hard-coded rules provided for developers for allowing the vehicle 102 to make informed decisions with respect to various driving scenarios. In another embodiment, the one or more active-learning computing processes 400 may include one or more machine-learning (ML) models (e.g., supervised learning models, unsupervised learning models, deep learning models, imitation learning models, inverse reinforcement learning (IRL) models, and so forth) that may be trained and learned over time based on, for example, human driving behavior, demonstrations, experiences, idiosyncrasies, and so forth that may allow the vehicle 102 to make autonomous decisions based on the real-world driving experiences of human drivers. In other embodiments, the one or more active-learning computing processes 400 may correspond to one or more computing and analyses processes that may be performed—at least in some part—online (e.g., onboard the vehicle 102).

In certain embodiments, the one or more active-learning computing processes 400 may begin with generating learned parameters by way of a trajectory planner training module 402 based on a training dataset 404. For example, in certain embodiments, the one or more active-learning computing processes 400 may include providing an initial training dataset 404 to the trajectory planner training module 402 to learn and train the trajectory planner training module 402. For example, in some embodiments, the initial training dataset 404 may include one or more large aggregates of vehicle 102 driving data collected and accumulated over time from a fleet of vehicles 102 deployed in a ride-sharing service, a delivery service, a rental service, a personal chauffeur service, or other similar vehicle-based driving service. Particularly, in one embodiment, the initial training dataset 404 may include, for example, tens of thousands or hundreds of thousands of human driving sample data collected over thousands or millions of human driving performances. In certain embodiments, the one or more active-learning computing processes 400 may then continue with the trajectory planner training module 402 generating a set of learned parameters 406 based on the initial training dataset 402. For example, in certain embodiments, the set of learned parameters 406 may include, for example, a set of values, metrics, functions, hyperparameters, weights, vectors, and/or gradients that may be most suitable for the parameterization, optimization, and configuration of the trajectory planner training module 402 with respect to the initial training dataset 404.

In certain embodiments, the one or more active-learning computing processes 400 may then continue with validating and evaluating trained and learned trajectory planner validation module 408 against a validation dataset 410. For example, in certain embodiments, the validation dataset 410 may include vehicle 102 environment data and human-based vehicle 102 driving data, in which the human-based vehicle 102 driving data may correspond to, for example, observed driving operations performed by a human driver in an environment corresponding to the vehicle environment data. In one embodiment, the validation dataset 410 may include vehicle 102 environment data and the associated human-based vehicle 102 driving data (e.g., one or more human-based trajectories) collected, accumulated, and associated over time based on a fleet of human-driven vehicles 102 deployed, for example, in a ride-sharing service, a delivery service, a rental service, a personal chauffeur service, or other similar vehicle-based driving service. In another embodiment, the validation dataset 410 may include vehicle 102 environment data and the associated compute-based vehicle driving data collected and accumulated over time based on one or more sensors (e.g., LiDAR data, IMU data, image data, and so forth) and/or one or more dedicated sensors or other similar systems (e.g., cameras, EDRs, data loggers, monitors, and so forth) that may be associated with, and utilized to monitor, the autonomous driving operations and driving environments of a fleet of autonomous vehicles 102. In some embodiments, the validation dataset 410 may also be updated and aggregated regularly or periodically based on additional human-based fleet vehicle driving data 412 and/or compute-based fleet vehicle driving data 412 that may be injected or fire hosed into the validation dataset 410 as these additional fleet vehicle driving data become available.

In certain embodiments, the one or more active-learning computing processes 400 may then continue with the trajectory planner validation module 408 generating compute-based vehicle driving data by processing the validation dataset 410 (e.g., vehicle environment data and human-based vehicle driving data) utilizing the trajectory planner validation module 408 as configured based on the generated learned parameters. For example, in certain embodiments, based on the validation dataset 410 (e.g., vehicle environment data and associated human-based trajectories) and the generated learned parameters (e.g., a set of values, metrics, functions, hyperparameters, weights, vectors, and/or gradients), the trajectory planner validation module 408 may generate compute-based vehicle driving data (e.g., one or more compute-based planned driving trajectories). In certain embodiments, the one or more active-learning computing processes 400 may then continue with the trajectory planner validation module 408 determining whether a discrepancy between the compute-based vehicle driving data and the human-based vehicle driving data satisfies one or more predetermined criteria. For example, in certain embodiments, the trajectory planner validation module 408 may analyze (e.g., offline via simulation) the compute-based vehicle driving data (e.g., one or more compute-based planned trajectories) and the human-based vehicle driving data (e.g., one or more human-based trajectories) by comparing one or more predetermined parameters associated with the compute-based vehicle driving data (e.g., one or more compute-based planned trajectories) and the human-based vehicle driving data (e.g., one or more human-based trajectories) to determine one or more discrepancies. That is, the trajectory planner validation module 408 may analyze (e.g., offline via simulation) the compute-based vehicle driving data (e.g., one or more compute-based planned trajectories) and the human-based vehicle driving data (e.g., one or more human-based trajectories) to find samples of data in the large aggregate of vehicle 102 environment data and vehicle 102 driving data that correspond to specific driving scenarios or examples in which one or more driving parameters associated with the planned trajectory are markedly different (e.g., based on a threshold or some predetermined criteria) from those corresponding parameters associated with the human trajectory for the same or similar driving scenarios or examples.

For example, in some embodiments, the trajectory planner validation module 408 may determine discrepancies between the compute-based vehicle driving data (e.g., one or more compute-based planned trajectories) and the human-based vehicle driving data (e.g., one or more human-based trajectories) by comparing one or more of, for example, velocity parameters, acceleration parameters, a braking parameters, steering angle parameters, jerk parameters, average distance parameters, lateral acceleration parameters, spatiotemporal overlap parameters, average violation of traffic laws parameters, gap selection parameters, disengagement parameters, progress in the route parameters, parameters expressing a proportion of driving scenarios in which the trajectory planner system selects a different behavior as compared to a human driver, latitudinal distance parameters, longitudinal distance parameters, a ride smoothness parameters, and so forth. In certain embodiments, the aforementioned driving parameters may be used to derive one or evaluation criteria that may be utilized to evaluate the planned trajectories generated by the trajectory planner training module 402. For example, in some embodiments, the derived evaluation criteria may include, for example, a similarity to human driving score, a legality score, a passenger comfort score, a disengagement score, a fuel range score, a collision score, or any of various or other evaluation criteria that may be utilized to evaluate and score the planned trajectories generated by the generated by the trajectory planner training module 402.

In certain embodiments, in response to determining the discrepancies between the compute-based vehicle 102 driving data (e.g., one or more compute-based planned trajectories) and the human-based vehicle 102 driving data (e.g., one or more human-based trajectories), the one or more active-learning computing processes 400 may then continue with the trajectory planner validation module 408 flagging one or more of the parameters associated with the planned trajectories corresponding to the determined discrepancies and generating a retraining dataset 414 (e.g., corresponding to edge case driving scenarios or examples in which trajectory planning training module 402 is determined to have performed undesirably with respect to the human-based vehicle 102 driving data) based on the vehicle 102 environment data and the human-based vehicle 102 driving data corresponding to the determined discrepancies.

For example, in certain embodiments, the retraining dataset 414 may include the identified edge case driving scenarios or examples in which trajectory planning training module 402 is determined to have performed undesirably with respect to the human-based vehicle 102 driving data corresponding to the determined discrepancies, as well as one or more of the parameters associated with the planned trajectory corresponding to the determined discrepancies. In certain embodiments, the retraining dataset 414 (e.g., corresponding to edge case driving scenarios or examples in which trajectory planning training module 402 is determined to have performed undesirably with to the human-based vehicle 102 driving data) may be fed back into the initial training dataset 404 for the trajectory planning training module 402, indicating one or more driving scenarios or examples in which the trajectory planning training module 402 fails to perform as well as human-driven vehicles 102. In this way, the one or more active-learning computing processes 400 may intelligently identify and flag driving data associated with driving scenarios or examples in which the trajectory planning training module 402 underperforms as compared to human-driven vehicles 102 and utilize those driving data associated with the driving scenarios or examples to iteratively retrain the trajectory planning training module 402 over time. Thus, the present techniques may improve over time the performance, efficiency, and efficacy of trajectory planner systems of autonomous or semi-autonomous vehicles, as the retraining of the trajectory planner systems are based on the training data generated based on human-based driving data (e.g., human-based driving data collected from a fleet of vehicles utilized in vehicle-based driving services) and the identified and flagged driving data associated with the driving scenarios or examples in which the trajectory planner system underperforms as compared to human-driven vehicles 102.

Figure 4:
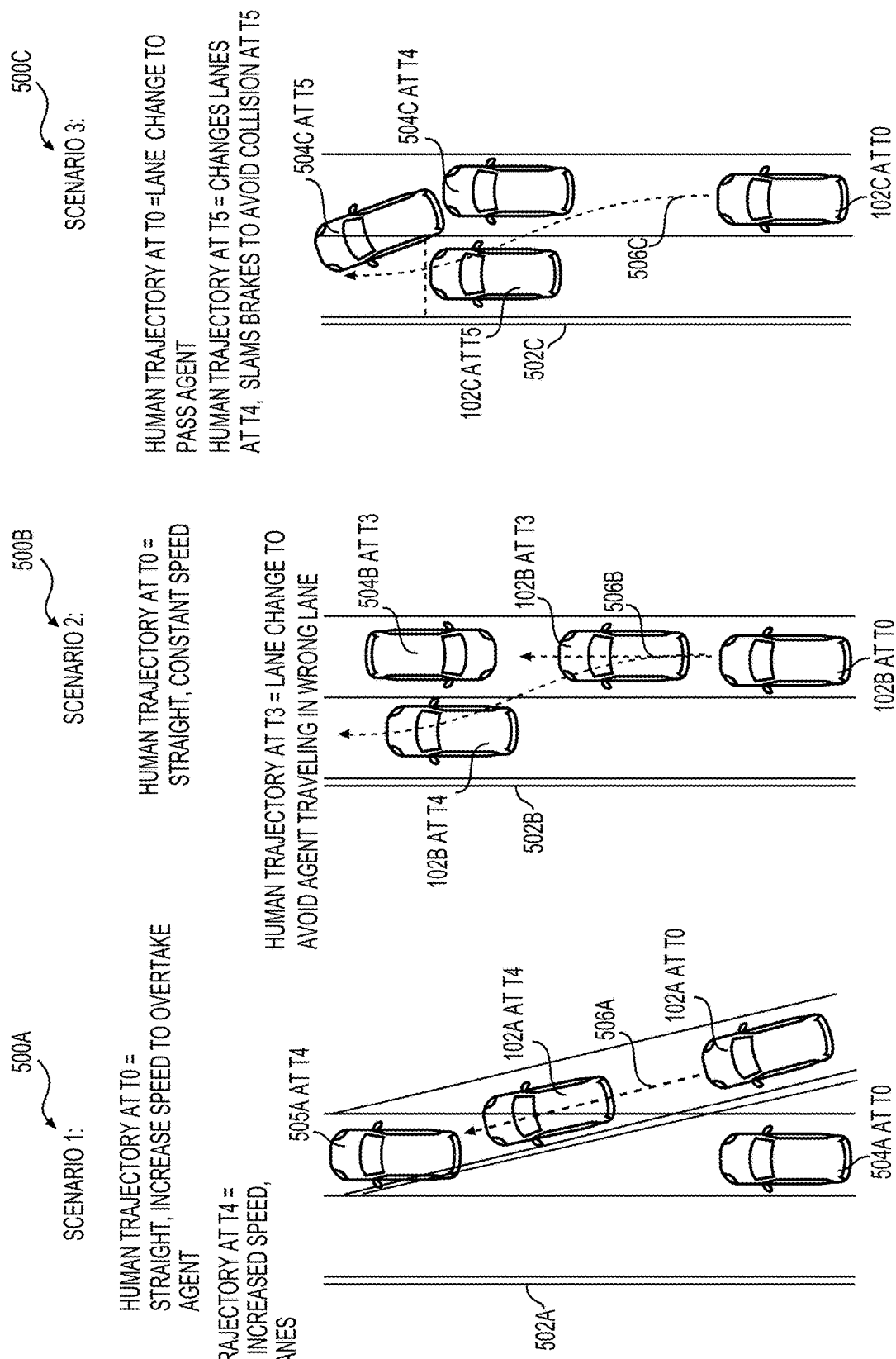
FIG. 4 illustrate one or more running examples of edge case driving scenarios as performed by human drivers and the corresponding one or more running examples of edge case driving scenarios as performed by a trajectory planner system.
Figure 5:
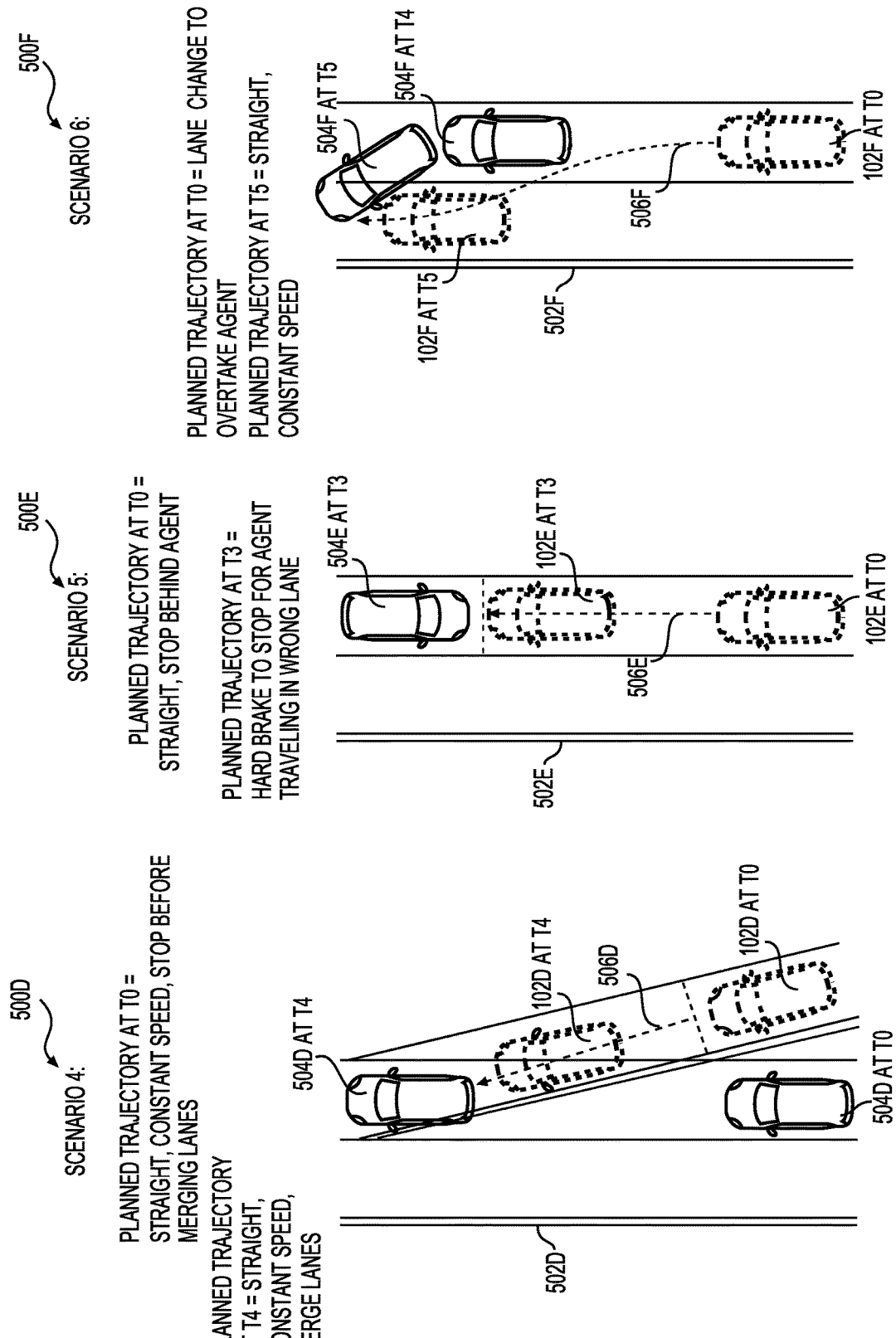
FIG. 5 illustrate one or more running examples of edge case driving scenarios as performed by human drivers and the corresponding one or more running examples of edge case driving scenarios as performed by a trajectory planner system.

FIG. 4 and FIG. 5 illustrate one or more running examples of edge case driving scenarios 500A, 500B, and 500C as performed by human drivers and the corresponding one or more running examples of edge case driving scenarios 500D, 500E, and 500F as performed by a trajectory planner system (e.g., active-learning computing processes 400), respectively. In accordance with the presently disclosed techniques, in certain embodiments, data associated with the one or more running examples of edge case driving scenarios 500A, 500B, and 500C as performed by human drivers may be identified and flagged as corresponding to edge case driving scenarios 500D, 500E, and 500F or examples in which the trajectory planner system underperforms as compared to human-driven vehicles. Indeed, while the running examples provided by FIGS. 4 and 5 may be discussed henceforth primarily with respect to agents 104, 105 represented as other vehicles, it should be appreciated that the independent trajectory validation techniques as presently disclosed herein may be applied in response to any of various detectable environmental conditions, such as objects (e.g., other vehicles, pedestrians, bicyclists, wildlife, vegetation, or any of various other moving and/or stationary objects) present within the environment, various weather and/or road conditions (e.g., wet road conditions, iced road conditions, road inclines, road declines, vehicle visibility range, and so forth), road and traffic communications (e.g., traffic lights, traffic signs, lane markings, lane boundaries, detours, school zones, railroad crossings, and so forth), among various other agents 104, 105 that may be present within the environment.

Further, it should be appreciated that the one or more running examples of edge case driving scenarios 500A, 500B, and 500C as performed by human drivers (as depicted in FIG. 4) and the corresponding one or more running examples of edge case driving scenarios 500D, 500E, and 500F as performed by a trajectory planner system (e.g., active-learning computing processes 400) (as depicted by FIG. 5) are included merely for the purposes of illustration and visual comparison. In implementation, and as generally discussed above with respect to FIG. 4, the trajectory planner system (e.g., active-learning computing processes 400) may compare (e.g., via simulation) the compute-based vehicle driving data (e.g., compute-based planned trajectories 506D, 506E, and 506F) and the human-based vehicle driving data (e.g., human trajectories 506A, 506B, and 506C) by comparing one or more predetermined parameters associated with the planned trajectories 506D, 506E, and 506F and the human trajectories 506A, 506B, and 506C to determine one or more discrepancies. Based on the identified discrepancies between the planned trajectories 506D, 506E, and 506F and the human trajectories 506A, 506B, and 506C, the trajectory planner system (e.g., active-learning computing processes 400) may flag the driving data associated with the driving scenarios corresponding to those identified discrepancies and utilize these driving data associated with the driving scenarios or examples to iteratively retrain the trajectory planner system over time. Indeed, in this manner, the trajectory planner system (e.g., active-learning computing processes 400) may be trained and learned based on vast human driving examples (e.g., tens of thousands or hundreds of thousands of samples of real-world human-driven trajectories at scale) being iteratively fed back into the initial training dataset 404 to iteratively train and retrain the trajectory planner system (e.g., active-learning computing processes 400) to identify and flag driving data associated with edge case human-driving scenarios (e.g., long-tailed driving experiences) and utilize those driving data to learn and emulate the driving behavior of human drivers for the same or similar driving scenarios.

For example, referring to FIG. 4, in the example edge case driving scenario 500A, human-driven ego vehicle 102A is attempting to merge into, for example, a single lane of a highspeed highway or roadway 502A on which agent vehicles 504A and 505A are also traveling at a constant velocity. Specifically, the edge case driving scenario 500A depicts where the human-driven ego vehicle 102A and agent vehicles 504A and 505A would be located at times T0 and T4. In this example, the human trajectory 506A for the human-driven ego vehicle 102A may include an increasing velocity and constant steering angle (at T0), such that the human-driving vehicle 102A may continue driving straight on the merging lanes of the highway or roadway 502A to overtake the agent vehicle 504A and merge (at T4) between the agent vehicle 504A and the agent vehicle 505A traveling at constant velocities on the highway or roadway 502A. In such a case, the human driver may have observed the speed of the agent vehicle 504A and determined that, in order to safely merge into the single lane of the highway or roadway 502A, the human driver should increase speed of the human-driven ego vehicle 102A beyond that of the agent 504A and less than that of the agent vehicle 505A.

Referring to FIG. 5, in the corresponding example edge case driving scenario 500D, autonomous ego vehicle 102D is attempting to merge into, for example, a single lane of a highspeed highway or roadway 502D on which an agent 504D is traveling at a constant velocity. Particularly, the edge case driving scenario 500D depicts where the autonomous ego vehicle 102D and agent 504D would be located at times T0 and T4. In this example, the planned trajectory 506D for the autonomous ego vehicle 102D may include a decreasing velocity and constant steering angle before braking to a complete stop (at T0), such that the vehicle 102D may yield to allow the agent vehicle 504D to pass before merging lanes of the highway or roadway 502D. The autonomous ego vehicle 102D may then proceed straight and at a constant velocity to merge (at T4) into the single lane of the highway or roadway 502D behind the agent 504D.

In such a case, even though the autonomous ego vehicle 102D safely merges into the single lane of the highway or roadway 502D after the agent vehicle 504D, the planned trajectory 506D and the human trajectory 506A may be analyzed (e.g., offline) to determine discrepancies with respect to parameters (e.g., velocity parameters, steering angle parameters, braking parameters, acceleration parameters, a spatiotemporal overlap, progress in the route) associated with the planned trajectory 506D and the human trajectory 506A. Based on the determined discrepancies between the planned trajectory 506D and the human trajectory 506A, the edge case driving scenario 500D corresponding to the determined discrepancies and the parameters associated with the planned trajectory 506D may be identified among aggregates of human driving datasets and flagged, and these driving data associated with the edge case driving scenario 500D may be utilized to iteratively retrain the trajectory planner system (e.g., active-learning computing processes 400) over time to more closely track and emulate, for example, the human trajectory 506A.

In certain embodiments, referring back to FIG. 4, in the example edge case driving scenario 500B, human-driven ego vehicle 102B may be driving straight and a constant speed along the roadway 502B. As depicted, an agent vehicle 504B may be traveling straight and at a constant velocity in the same lane (e.g., in the opposite direction of the human-driven ego vehicle 102B) of the roadway 502B. Specifically, the edge case driving scenario 500B depicts where the human-driven ego vehicle 102B and the agent vehicle 504B would be located at times T0 and T3. In this example, at T0, the human trajectory 506B for the human-driven ego vehicle 102A may include a constant velocity and constant steering angle, such that the human-driven ego vehicle 102B may continue driving straight on the roadway 502B. As further depicted, at T3, the agent 504B may be traveling straight and at a constant velocity in the wrong lane of the roadway 502B. Based on an observation that the agent 504B has confused lanes and/or the right-of-way of the roadway 502B and is traveling in the same lane of the roadway 502B (e.g., such that a collision would potentially occur between the human-driven ego vehicle 102B), at T3, the human-driven ego vehicle 102B may reflexively swerve into the passing lane of the roadway 502B to avoid a potential collision with the agent vehicle 504B.

Referring again to FIG. 5, in the corresponding example edge case driving scenario 500E, autonomous ego vehicle 102E may be driving straight and a constant velocity along the roadway 502E. As depicted, an agent 504E may be traveling straight and at a constant velocity in the same lane (e.g., in the opposite direction of the autonomous ego vehicle 102E) of the roadway 502E. Specifically, the edge case driving scenario 500E depicts where the autonomous ego vehicle 102E and the agent vehicle 504E would be located at times T0 and T3. In this example, at T0, the planned trajectory 506E for the autonomous ego vehicle 102E may include a constant velocity and constant steering angle, such that the autonomous ego vehicle 102E may continue driving straight on the roadway 502E. Similar to the corresponding edge case driving scenario 500B as discussed above, at T3, the agent vehicle 504E may be traveling straight and at a constant velocity in the wrong lane of the roadway 502E.

In certain embodiments, based on the detection or perception of the agent 504E traveling in the wrong lane, at T3, the autonomous ego vehicle 102E may engage the brakes to come to a complete and abrupt stop (e.g., hard braking) to avoid a potential collision with the agent vehicle 504E. In such a case, even though the autonomous ego vehicle 102E may safely stop before potentially colliding with the agent vehicle 504E, the planned trajectory 506E and the human trajectory 506B may be analyzed (e.g., offline) to determine discrepancies with respect to parameters (e.g., velocity parameters, braking parameters, steering angle parameters, jerk parameters, lateral acceleration parameters, and so forth) associated with the planned trajectory 506E and the human trajectory 506B. For example, in certain embodiments, the example edge case driving scenario 500E may be identified among aggregates of human driving datasets and the velocity parameters, braking parameters, steering angle parameters, jerk parameters, lateral acceleration parameters associated with the planned trajectory 506E may be flagged as discrepancies. These driving data associated with the edge case driving scenario 500E and the planned trajectory 506E may be utilized to iteratively retrain the trajectory planner system (e.g., active-learning computing processes 400) over time to more closely track and emulate, for example, the human trajectory 506B.

In certain embodiments, referring back to FIG. 4, in the example edge case driving scenario 500C, human-driven ego vehicle 102C may be driving straight and a constant velocity along the roadway 502C. Specifically, the edge case driving scenario 500C depicts where the human-driven ego vehicle 102C and agent vehicle 504C would be located at times T0, T4, and T5. In this example, at T0, the human trajectory 506C for the human-driven ego vehicle 102C may include a constant velocity and varying steering angle, such that the human-driven ego vehicle 102C may drive straight and change lanes at T4 along the roadway 502A to attempt to overtake the agent vehicle 504C (at T5) traveling in the same lane of the roadway 502C. In certain embodiments, as depicted by the example edge case driving scenario 500C, at T4, the human-driven ego vehicle 102C may begin to change lanes into the passing lane and at a constant velocity in the attempt to overtake the agent vehicle 504C. At T5, the agent vehicle 504C may suddenly veer into the passing lane of the roadway 502C. For example, in one instance, the agent vehicle 504C may veer into the passing lane of the roadway 502C at a moment in which the human-driven ego vehicle 102C travels into the "blind spot" of the agent vehicle 504C. Thus, at T5, the human-driven ego vehicle 102C may slam the brakes or perform a hard-braking to come to a moving stop or an abrupt stop to avoid a collision with the agent vehicle 504C. In such a case, the human driver, practicing, for example, skilled defensive driving, may have quickly observed that the driver of the agent vehicle 504C was apparently preparing to veer into the passing lane of the roadway 502C and may have begun to engage the brakes before the agent vehicle 504C veered into the passing lane.

Referring again to FIG. 5, in the example edge case driving scenario 500F, autonomous ego vehicle 102F may be driving straight and a constant velocity along the roadway 502F. Specifically, the edge case driving scenario 500F depicts where the human-driven ego vehicle 102F and agent vehicle 504F would be located at times T0, T4, and T5. In this example, at T0, the human trajectory 506F for the autonomous ego vehicle 102F may include a constant velocity and varying steering angle, such that the autonomous ego vehicle 102F may drive straight and change lanes at T4 along the roadway 502F to attempt to overtake the agent vehicle 504F (at T5) traveling in the same lane of the roadway 502F. In certain embodiments, as depicted by the example edge case driving scenario 500F, at T4, the autonomous ego vehicle 102F may begin to change lanes into the passing lane and at a constant velocity in the attempt to overtake the agent vehicle 504C. At T5, the agent vehicle 504C may suddenly veer into the passing lane of the roadway 502C and potentially collide with the autonomous ego vehicle 102F. In such a case, the planned trajectory 506F and the human trajectory 506C may be analyzed (e.g., offline) to determine discrepancies with respect to parameters (e.g., velocity parameters, acceleration parameters, braking parameters, steering angle parameters, jerk parameters, lateral acceleration parameters, spatiotemporal overlap parameters, and so forth) associated with the planned trajectory 506F and the human trajectory 506C. For example, in certain embodiments, the example edge case driving scenario 500E may be identified among aggregates of human driving datasets and the velocity parameters, braking parameters, steering angle parameters, jerk parameters, lateral acceleration parameters associated with the planned trajectory 506F may be flagged as discrepancies. These driving data associated with the edge case driving scenario 500F and the planned trajectory 506F may be utilized to iteratively retrain the trajectory planner system (e.g., active-learning computing processes 400) over time to more closely track and emulate, for example, the human trajectory 506C.

Figure 6:
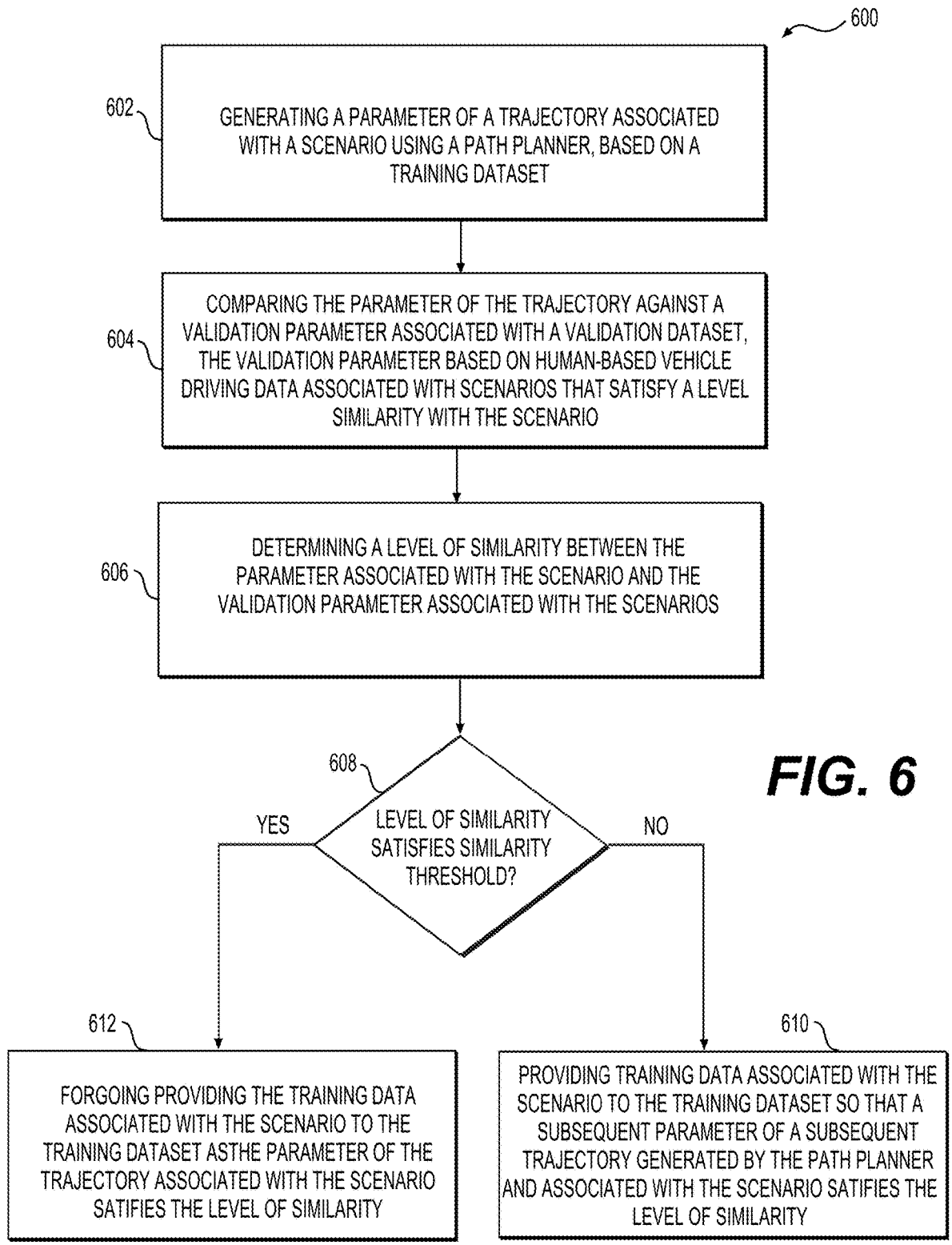
FIG. 6 illustrates a flow diagram of a method for intelligently processing a large number of driving scenarios and identifying and assessing edge case driving scenarios by identifying discrepancies between planned trajectories and human-driven trajectories.

FIG. 6 illustrates a flow diagram of a method 600 for intelligently processing a large number of driving scenarios and identifying and assessing edge case driving scenarios by identifying discrepancies between trajectory planner system planned trajectories and human-driven trajectories, and further flagging data associated with the driving scenarios corresponding to those identified discrepancies, in accordance with the presently disclosed techniques. The method 600 may be performed utilizing one or more processing devices (e.g., active-learning computing processes 400) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 600 may begin at block 602 with one or more processing devices (e.g., active-learning computing processes 400) generating a parameter of a trajectory associated with a scenario using a path planner, in which the parameter is generated based on a training dataset. The method 600 may then continue at block 604 with the one or more processing devices (e.g., active-learning computing processes 400) comparing the parameter of the trajectory against a validation parameter associated with a validation dataset, in which the validation parameter is based on human-based vehicle driving trajectory data associated with one or more scenarios that satisfy a level of similarity with the scenario. The method 600 may then continue at block 606 with the one or more processing devices (e.g., active-learning computing processes 400) determining a level of similarity between the parameter associated with the scenario and the validation parameter associated with the one or more scenarios.

The method 600 may then continue at decision 608 with the one or more processing devices (e.g., active-learning computing processes 400) determining that the level of similarity fails to satisfy a similarity threshold, and then continue at block 610 with the one or more processing devices (e.g., active-learning computing processes 400) providing training data associated with the scenario to the training dataset so that a subsequent parameter of a subsequent trajectory generated by the path planner and associated with the scenario satisfies the level of similarity against the validation parameter. Returning to decision 608 with the one or more processing devices (e.g., active-learning computing processes 400) determining that the level of similarity fails satisfies the similarity threshold, the method 600 may conclude at block 612 with the one or more processing devices (e.g., active-learning computing processes 400) forgoing providing the training data associated with the scenario to the training dataset as the parameter of the trajectory associated with the scenario satisfies the level of similarity against the validation parameter.

Accordingly, as described by the method 600 of FIG. 6, the present techniques include providing one or more active-learning computing processes for intelligently processing a large number of driving scenarios and identifying and assessing edge case driving scenarios by identifying discrepancies between trajectory planner system planned trajectories and human-driven trajectories, and further flagging data associated with the driving scenarios corresponding to those identified discrepancies. In certain embodiments, the one or more active-learning computing processes may begin with generating learned parameters by way of a trajectory planner system based on training data. For example, in certain embodiments, the one or more active-learning computing processes may include providing an initial training dataset to the trajectory planner system to learn and train the trajectory planner system. For example, in some embodiments, the initial training dataset may include one or more large aggregates of vehicle driving data collected and accumulated over time from a fleet of vehicles deployed in a ride-sharing service, a delivery service, a rental service, a personal chauffeur service, or other similar vehicle-based driving service. In certain embodiments, the one or more active-learning computing processes may then continue with the trajectory planner system generating a set of learned parameters based on the initial training dataset. For example, in certain embodiments, the set of learned parameters may include, for example, a set of values, metrics, functions, hyperparameters, weights, vectors, and/or gradients that may be most suitable for the parameterization, optimization, and configuration of the trajectory planner system with respect to the initial training data.

In certain embodiments, the one or more active-learning computing processes may then continue with validating and evaluating the trained and learned trajectory planner system against validation data. For example, in certain embodiments, the validation data may include vehicle environment data and human-based vehicle driving data, in which the human-based vehicle driving data may correspond to, for example, observed driving operations performed by a human driver in an environment corresponding to the vehicle environment data. In one embodiment, the validation dataset may include vehicle environment data and the associated human-based vehicle driving data (e.g., one or more human-based trajectories) collected, accumulated, and associated over time based on a fleet of human-driven vehicles deployed in a ride-sharing service, a delivery service, a rental service, a personal chauffeur service, or other similar vehicle-based driving service. In another embodiment, the validation dataset may include vehicle environment data and the associated compute-based vehicle driving data collected and accumulated over time based on one or more sensors (e.g., LiDAR data, IMU data, image data, and so forth) and/or one or more dedicated sensors or other similar systems (e.g., cameras, EDRs, data loggers, monitors, and so forth) that may be associated with, and utilized to monitor, the autonomous driving operations and driving environments of a fleet of autonomous or semi-autonomous vehicles. In some embodiments, the validation dataset may also be updated and aggregated regularly or periodically based on additional human-based fleet vehicle driving data and/or compute-based fleet vehicle driving data that may be injected or fire hosed into the validation dataset as these fleet vehicle driving data become available.

In certain embodiments, the one or more active-learning computing processes may then continue with the trajectory planner system generating compute-based vehicle driving data by processing the validation dataset (e.g., vehicle environment data and human-based vehicle driving data) utilizing the trajectory planner system configured utilizing the generated learned parameters. For example, in certain embodiments, based on the validation dataset (e.g., vehicle environment data and associated human-based trajectories) and the generated learned parameters (e.g., a set of values, metrics, functions, hyperparameters, weights, vectors, and/or gradients), the trajectory planner system may generate compute-based vehicle driving data (e.g., one or more compute-based planned driving trajectories). In certain embodiments, the one or more active-learning computing processes may then continue with the trajectory planner system determining whether a discrepancy between the compute-based vehicle driving data and the human-based vehicle driving data satisfies one or more predetermined criteria. For example, in certain embodiments, the trajectory planner system may compare the compute-based vehicle driving data (e.g., one or more compute-based planned trajectories) and the human-based vehicle driving data (e.g., one or more human-based trajectories) by comparing one or more predetermined parameters associated with the compute-based vehicle driving data (e.g., one or more compute-based planned trajectories) and the human-based vehicle driving data (e.g., one or more human-based trajectories) to determine one or more discrepancies.

For example, in some embodiments, the trajectory planner system may determine discrepancies between the compute-based vehicle driving data (e.g., one or more compute-based planned trajectories) and the human-based vehicle driving data (e.g., one or more human-based trajectories) by comparing one or more of, for example, a velocity parameter, an acceleration parameter, a braking parameter, a steering angle, a jerk parameter, an average distance parameter, a lateral acceleration parameter, a spatiotemporal overlap parameter, an average violation of traffic laws parameter, a gap selection parameter, a disengagement parameter, a progress in the route parameter, a parameter expressing a proportion of driving scenarios in which the trajectory planner system selects a different behavior as compared to a human driver, and so forth. In certain embodiments, in response to determining the discrepancies between the compute-based vehicle driving data (e.g., one or more compute-based planned trajectories) and the human-based vehicle driving data (e.g., one or more human-based trajectories), the one or more active-learning computing processes may then continue with the trajectory planner system flagging one or more of the parameters associated with the vehicle environment data and the human-based vehicle driving data (e.g., human-based drive trajectories) corresponding to the determined discrepancies and generating a retraining dataset based on the vehicle environment data and the human-based vehicle driving data corresponding to the determined discrepancies.

For example, in certain embodiments, the retraining dataset may include the vehicle environment data and the human-based vehicle driving data (e.g., human-based drive trajectories) corresponding to the determined discrepancies, as well as one or more of the parameters associated with the vehicle environment data and the human-based vehicle driving data (e.g., human-based drive trajectories) corresponding to the determined discrepancies. In certain embodiments, the retraining dataset may be fed back into the initial training data for the trajectory planner system, indicating one or more driving scenarios or examples in which the trajectory planner system fails to perform as well as human-driven vehicles. In this way, the one or more active-learning computing processes may repeatedly identify and flag driving scenarios or examples in which the trajectory planner system underperforms as compared to human-driven vehicles and utilize those data associated with the driving scenarios or examples to iteratively retrain the trajectory planner system over time.

In this way, the one or more active-learning computing processes may intelligently identify and flag driving data associated with driving scenarios or examples in which the trajectory planning training module underperforms as compared to human-driven vehicles and utilize those driving data associated with the driving scenarios or examples to iteratively retrain the trajectory planning training module over time. Thus, the present techniques may improve the performance, efficiency, and efficacy of the trajectory planner system over time, as the training and retraining of the trajectory planner systems are based on training data including human-based driving data (e.g., human-based driving data collected from a fleet of vehicles utilized in vehicle-based driving services) and the identified and flagged driving data associated with the driving scenarios or examples in which the trajectory planner system underperforms as compared to human-driven vehicles. Indeed, in this manner, the trajectory planner system may be trained and learned based on a vast array of human driving examples (e.g., tens of thousands or hundreds of thousands of samples of real-world human-driven trajectories at scale) being iteratively fed back into the initial training dataset to iteratively train and retrain the trajectory planner system to identify and flag driving data associated with edge case human-driving scenarios (e.g., long-tailed driving experiences) and utilize those driving data to learn and emulate the driving behavior of human drivers for the same or similar driving scenarios or examples. Moreover, because the one or more active-learning computing processes may be performed offline, the training and retraining of the trajectory planner system may be scaled and shared across an entire fleet of autonomous or semi-autonomous vehicles.

Figure 7:
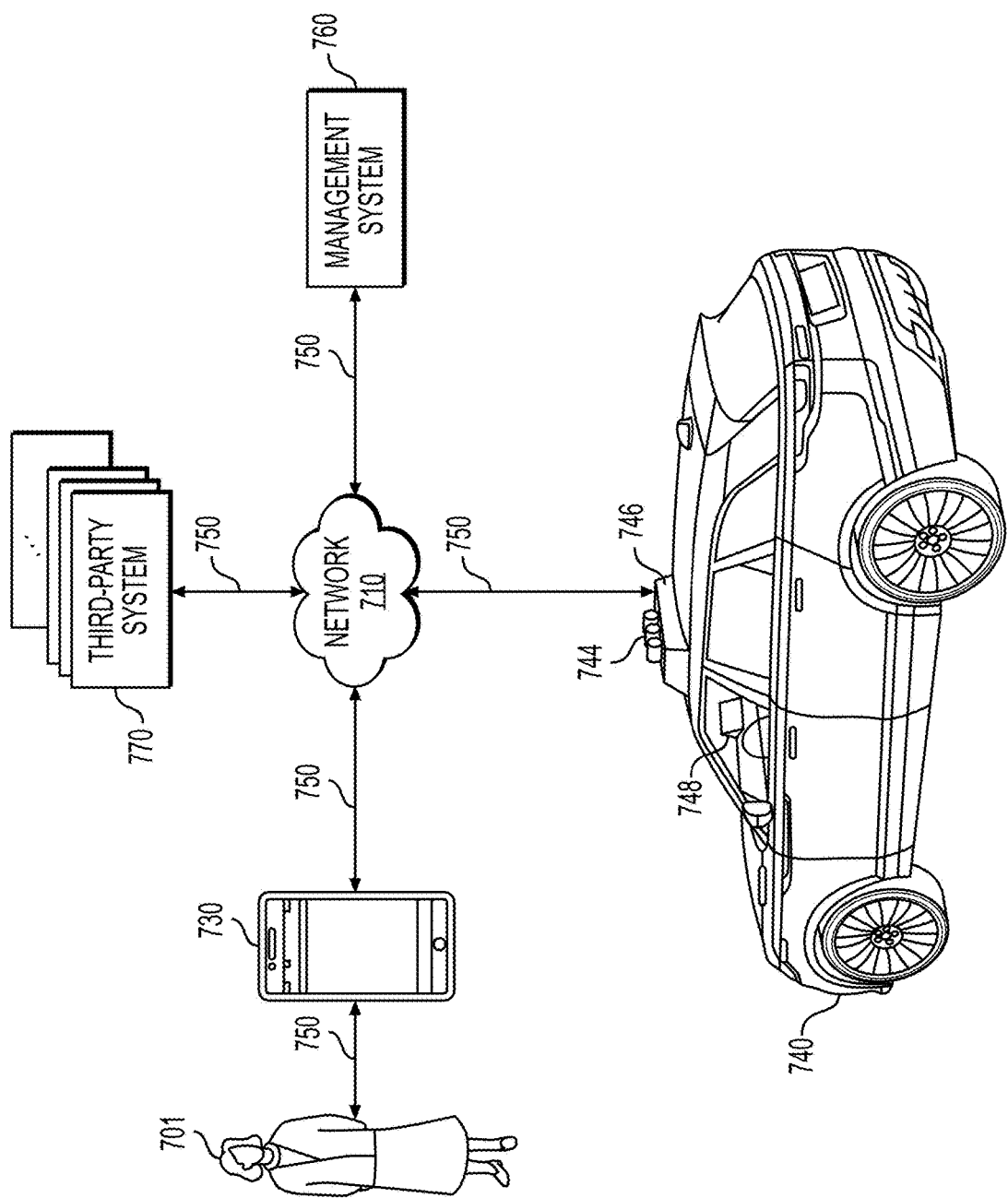
FIG. 7 illustrates an example block diagram of a transportation management environment.

FIG. 7 illustrates an example block diagram of a transportation management environment that may be utilized to perform one or more of the forgoing embodiments as discussed herein. In certain embodiments, the environment may include various computing entities, such as a user computing device 730 of a user 701 (e.g., a ride provider or requestor), a transportation management system 760, an autonomous or semi-autonomous vehicle 740, and one or more third-party system 770. The computing entities may be communicatively connected over any suitable network 710. For example, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In certain embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. For example, the network environment may include multiple users 701, user devices 730, transportation management system 760, autonomous or semi-autonomous vehicles 740, third-party systems 770, and networks 710.

The user device 730, transportation management system 760, autonomous or semi-autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, and so forth), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP).

FIG. 7 illustrates transmission links 750 that connect user device 730, autonomous or semi-autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In certain embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities may not necessarily use the same type of transmission link 750. For example, the user device 730 may communicate with the transportation management system via a cellular network and the Internet but communicate with the autonomous vehicle 740 via Bluetooth or a physical wire connection.

In certain embodiments, the transportation management system 760 may fulfill ride requests for one or more users 701 by dispatching suitable vehicles. The transportation management system 760 may receive any number of ride requests from any number of ride requestors 701. In certain embodiments, a ride request from a ride requestor 701 may include an identifier that identifies the ride requestor in the system 760. The transportation management system 760 may utilize the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In certain embodiments, ride requestor information may include profile information about a particular ride requestor 701.

In certain embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, and so forth), entertainment preferences and settings (e.g., preferred music genre or playlist, audio volume, display brightness, and so forth), temperature settings, whether conversation with the driver is welcomed, frequent destinations, historical riding patterns (e.g., time of day of travel, starting and ending locations, and so forth), preferred language, age, gender, or any other suitable information. In certain embodiments, the transportation management system 760 may classify a user 701 based on known information about the user 701 (e.g., using ML classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. For example, when the transportation management system 760 receives a request to travel from San Francisco International Airport (SFO) to Palo Alto, California, the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride.

In certain embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, and so forth), a category/class of users (e.g., based on demographics), and/or all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, and so forth.

As yet another example, historical data associated with all users may include general usage trends, such as traffic and ride patterns. Using historical data, the system 760 in certain embodiments may predict and provide ride suggestions in response to a ride request. In certain embodiments, the system 760 may utilize machine-learning, such as neural networks, regression algorithms, instance-based algorithms (e.g., k-Nearest Neighbor), decision-tree algorithms, Bayesian algorithms, clustering algorithms, association-rulelearning algorithms, deep-learning algorithms, dimensionality-reduction algorithms, ensemble algorithms, and any other suitable ML algorithms known to persons of ordinary skill in the art. The ML models may be trained using any suitable training algorithm, including supervised learning based on labeled training data, unsupervised learning based on unlabeled training data, and/or semi-supervised learning based on a mixture of labeled and unlabeled training data.

In certain embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In certain embodiments, each server may include hardware, software, or embedded logic components or a combination of two or more such components for carrying out the appropriate functionalities implemented or supported by the server.

In certain embodiments, transportation management system 760 may include one or more data stores. The data stores may be used to store various types of information, such as ride information, ride requestor information, ride provider information, historical information, third-party information, or any other suitable type of information. In certain embodiments, the information stored in the data stores may be organized according to specific data structures. In certain embodiments, each data store may be a relational, columnar, correlation, or any other suitable type of database system. Although this disclosure describes or illustrates particular types of databases, this disclosure contemplates any suitable types of databases. Certain embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In certain embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In certain embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In certain embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are to be accessed the third-party system 770, the user 701 may provide such information to the transportation management system 760, which may serve as a proxy for accessing content from the third-party system 770.

In certain embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE/5G mobile communication standard. User device 730 may also include one or more cameras, scanners, touchscreens, microphones, speakers, and any other suitable input-output devices.

In certain embodiments, the vehicle 740 may be an autonomous or semi-autonomous vehicle and equipped with an array of sensors 744, a navigation system 746, and a ride-service computing device 748. In certain embodiments, a fleet of autonomous or semi-autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In certain embodiments, the autonomous or semi-autonomous vehicles 740 may receive data from and transmit data to the transportation management system 760 and the third-party system 770. Example of received data may include, e.g., instructions, new software or software updates, maps, 3D models, trained or untrained ML models, location information (e.g., location of the ride requestor, the autonomous or semi-autonomous vehicle 740 itself, other vehicles 740, and target destinations such as service centers), navigation information, traffic information, weather information, entertainment content (e.g., music, video, and news) ride requestor information, ride information, and any other suitable information. Examples of data transmitted from the autonomous or semi-autonomous vehicle 740 may include, e.g., telemetry and sensor data, determinations/decisions based on such data, vehicle condition or state (e.g., battery/ fuel level, tire and brake conditions, sensor condition, speed, odometer, and so forth), location, navigation data, passenger inputs (e.g., through a user interface in the vehicle 740, passengers may send/receive data to the transportation management system 760 and/or third-party system 770), and any other suitable data.

In certain embodiments, autonomous or semi-autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In certain embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In certain embodiments, an autonomous or semi-autonomous vehicle 740 may obtain and process sensor/telemetry data. Such data may be captured by any suitable sensors. For example, the vehicle 740 may have a LiDAR sensor array of multiple LiDAR transceivers that are configured to rotate 360°, emitting pulsed laser light and measuring the reflected light from objects surrounding vehicle 740. In certain embodiments, LiDAR transmitting signals may be steered by use of a gated light valve, which may be a MEMs device that directs a light beam using the principle of light diffraction. Such a device may not use a gimbaled mirror to steer light beams in 360° around the autonomous or semi-autonomous vehicle. Rather, the gated light valve may direct the light beam into one of several optical fibers, which may be arranged such that the light beam may be directed to many discrete positions around the autonomous or semi-autonomous vehicle. Thus, data may be captured in 360° around the autonomous or semi-autonomous vehicle, but no rotating parts may be necessary. A LiDAR is an effective sensor for measuring distances to targets, and as such may be used to generate a 3D model of the external environment of the autonomous or semi-autonomous vehicle 740. For example, the 3D model may represent the external environment including objects such as other cars, curbs, debris, objects, and pedestrians up to a maximum range of the sensor arrangement (e.g., 50 meters, 100 meters, or 200 meters).

As another example, the autonomous or semi-autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In certain embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection.

While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on the autonomous or semi-autonomous vehicle 740. Example locations for sensors include the front and rear bumpers, the doors, the front windshield, on the side panel, or any other suitable location.

In certain embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest. In certain embodiments, the autonomous vehicle 740 may have a navigation system 746 responsible for safely navigating the autonomous vehicle 740. In certain embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, and so forth). In certain embodiments, the navigation system 746 may utilize its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In certain embodiments, the autonomous or semi-autonomous vehicle 740 may be equipped with a ride-service computing device 748, which may be a tablet computer, or any other suitable device installed by transportation management system 760 to allow the user to interact with the autonomous vehicle 740, transportation management system 760, other users 701, or third-party systems 770. In certain embodiments, installation of ride-service computing device 748 may be accomplished by placing the ride-service computing device 748 inside autonomous vehicle 740, and further configuring it to communicate with the vehicle 740 via a wire or wireless connection (e.g., via Bluetooth). Although FIG. 7 illustrates a single ride-service computing device 748 at a particular location in autonomous vehicle 740, autonomous or semi-autonomous vehicle 740 may include several ride-service computing devices 748 in several different locations within the vehicle.

For example, the autonomous or semi-autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In certain embodiments, ride-service computing device 748 may be detachable from any component of autonomous vehicle 740. This may allow users to handle ride-service computing device 748 in a manner consistent with other tablet computing devices. For example, a user may move ride-service computing device 748 to any location in the cabin or passenger compartment of the autonomous or semi-autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
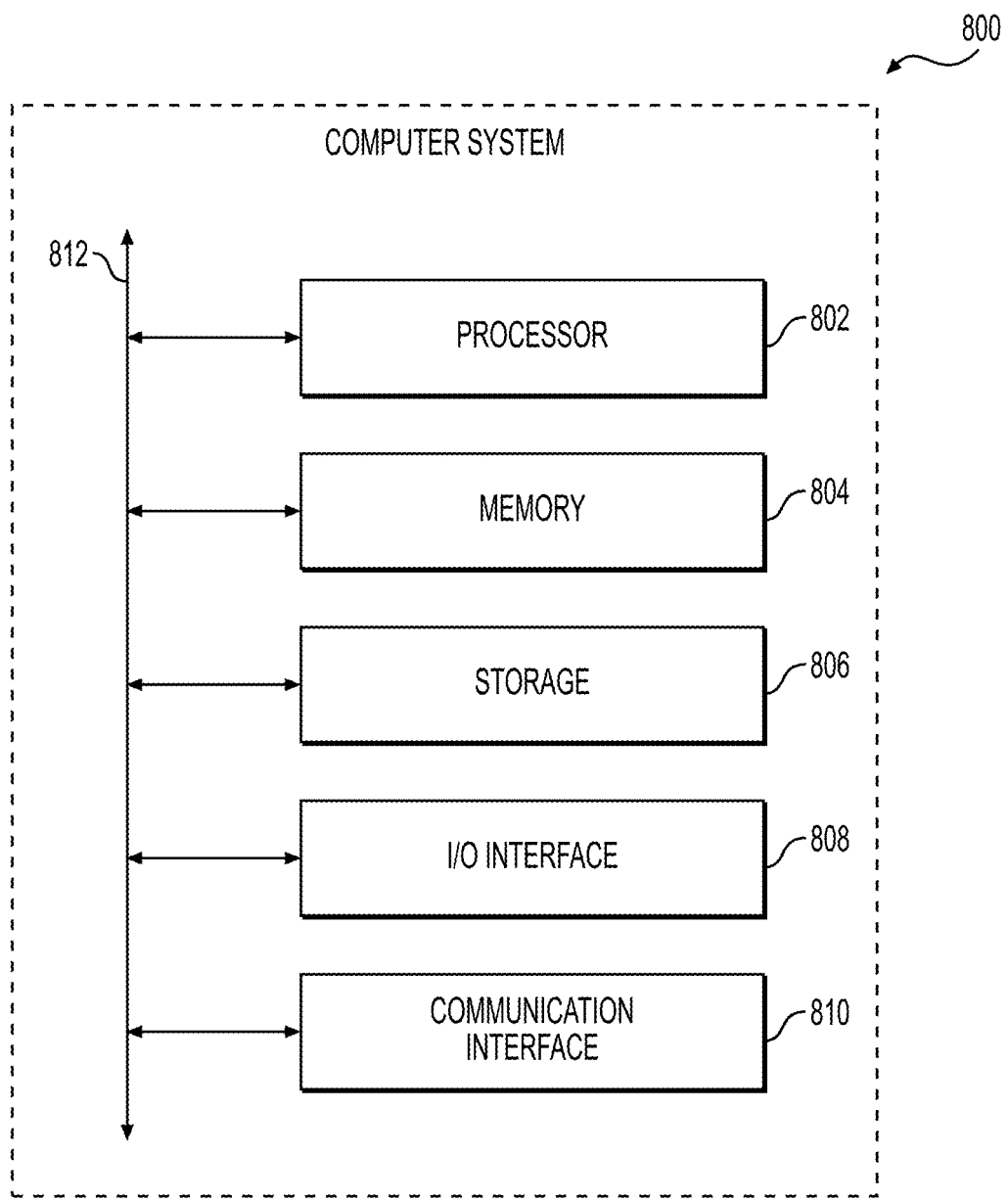
FIG. 8 illustrates an example of a computing system.

FIG. 8 illustrates an example computer system 800 that may be utilized to perform one or more of the forgoing embodiments as discussed herein. In certain embodiments, one or more computer systems 800 perform one or more steps of one or more methods described or illustrated herein. In certain embodiments, one or more computer systems 800 provide the functionalities described or illustrated herein. In certain embodiments, software running on one or more computer systems 800 performs one or more steps of one or more methods described or illustrated herein or provides the functionalities described or illustrated herein. Certain embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. For example, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In certain embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In certain embodiments, processor 802 includes hardware for executing instructions, such as those making up a computer program. For example, to execute instructions, processor 802 may retrieve (or fetch) the instructions from an internal register, an internal cache, memory 804, or storage 806; decode and execute them; and then write one or more results to an internal register, an internal cache, memory 804, or storage 806. In certain embodiments, processor 802 may include one or more internal caches for data, instructions, or addresses. This disclosure contemplates processor 802 including any suitable number of any suitable internal caches, where appropriate. For example, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In certain embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In certain embodiments, memory 804 includes main memory for storing instructions for processor 802 to execute or data for processor 802 to operate on. For example, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804.

In certain embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In certain embodiments, one or more memory management units (MMUs) reside between processor 802 and memory 804 and facilitate accesses to memory 804 requested by processor 802. In certain embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In certain embodiments, storage 806 includes mass storage for data or instructions. For example, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In certain embodiments, storage 806 is non-volatile, solid-state memory. In certain embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In certain embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. For example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In certain embodiments, communication interface 810 includes hardware, software, or both providing one or more interfaces for communication (such as, for example, packet-based communication) between computer system 800 and one or more other computer systems 800 or one or more networks. For example, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. For example, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In certain embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

The invention claimed is:

1. A method comprising, by a computing system:
generating, using a path planner, a trajectory parameter about a trajectory associated with controlling a vehicle through a scenario, the trajectory parameter indicating an aspect about controlling the vehicle over the trajectory;
comparing the trajectory parameter of the trajectory against a validation parameter associated with a validation dataset to determine a level of similarity, wherein the validation parameter is based on human-based vehicle driving trajectory data, wherein the trajectory parameter additionally indicates quantitative measures of relationships between the vehicle and objects in an environment; and
responsive to determining that the level of similarity indicates that the trajectory parameter is not similar to the validation parameter, providing training data associated with the scenario to a training dataset so that a subsequent parameter of a subsequent trajectory generated by the path planner and associated with the scenario satisfies the level of similarity against the validation parameter and flagging the trajectory as being insufficiently similar to the human-based vehicle driving trajectory data,
wherein the level of similarity is based on one or more predetermined criteria, and the predetermined criteria correspond to one or more driving parameters, the predetermined criteria including at least a legality score that indicates whether the trajectory complies with local laws.

2. The method of claim 1, wherein providing the training data associated with the scenario to the training dataset further comprises providing training data corresponding to an identified type of scenario, wherein the training data corresponding to the identified type of scenario is utilized to train the path planner to generate the subsequent trajectory.

3. The method of claim 1, wherein the validation dataset includes environmental data associated with the one or more scenarios, and the trajectory is generated by the path planner using the environmental data.

4. The method of claim 1, wherein the predetermined criteria including the legality score, a passenger comfort score, a disengagement score, a fuel range score, and a collision score.

5. The method of claim 1, wherein the validation dataset is iteratively updated with additional environment data and additional human-based vehicle driving data, the additional human-based vehicle driving data corresponding to observed operations performed by human drivers in a plurality of environments.

6. The method of claim 1, further comprising identifying a subset of the training dataset that corresponds to one or more edge case driving scenarios for which the path planner fails to emulate human driving behavior determined based on human-based vehicle driving data.

7. The method of claim 1, wherein the trajectory parameter is one or more of a velocity parameter, an acceleration parameter, a braking parameter, a steering angle parameter, a jerk parameter, an average distance parameter, a lateral acceleration parameter, a spatiotemporal overlap parameter, an average violation of traffic laws parameter, a gap selection parameter, a disengagement parameter, a latitudinal distance parameter, a longitudinal distance parameters, or a ride smoothness parameter.

8. A system, comprising:
one or more non-transitory computer-readable storage media including instructions; and
one or more processors coupled to the non-transitory computer-readable storage media, the one or more processors configured to execute the instructions to:
generate, using a path planner, a trajectory parameter about a trajectory associated with controlling a vehicle through a scenario, the trajectory parameter indicating an aspect about controlling the vehicle over the trajectory;
compare the trajectory parameter of the trajectory against a validation parameter associated with a validation dataset to determine a level of similarity, wherein the validation parameter is based on human-based vehicle driving trajectory data, wherein the trajectory parameter additionally indicates quantitative measures of relationships between the vehicle and objects in an environment;
and responsive to determining that the level of similarity indicates that the trajectory parameter is not similar to the validation parameter, provide training data associated with the scenario to a training dataset so that a subsequent parameter of a subsequent trajectory generated by the path planner and associated with the scenario satisfies the level of similarity against the validation parameter and flag the trajectory as being insufficiently similar to the human-based vehicle driving trajectory data,
wherein the level of similarity is based on one or more predetermined criteria, and the predetermined criteria correspond to one or more driving parameters, the predetermined criteria including at least a legality score that whether indicates the trajectory complies with local laws.

9. The system of claim 8, wherein the one or more processors are further configured to execute the instructions to provide training data corresponding to an identified type of scenario, wherein the training data corresponding to the identified type of scenario is utilized to train the path planner to generate the subsequent trajectory.

10. The system of claim 8, wherein the validation dataset includes environmental data associated with the one or more scenarios, and the trajectory is generated by the path planner using the environmental data.

11. The system of claim 8, wherein the level of similarity is based on one or more predetermined criteria, and the predetermined criteria correspond to one or more driving parameters.

12. The system of claim 8, wherein the one or more non-transitory computer-readable storage media further comprises instructions that when executed by the one or more processors are further configured to identify a subset of the training dataset that corresponds to one or more edge case driving scenarios for which the path planner fails to emulate human driving behavior determined based on human-based vehicle driving data.

13. A non-transitory computer-readable medium comprising instructions that, when executed by one or more processors of a computing device, cause the one or more processors to:
   generate, using a path planner, a trajectory parameter about a trajectory associated with controlling a vehicle through a scenario, the trajectory parameter indicating an aspect about controlling the vehicle over the trajectory;
   compare the trajectory parameter of the trajectory against a validation parameter associated with a validation dataset to determine a level of similarity, wherein the validation parameter is based on human-based vehicle driving trajectory data, wherein the trajectory parameter additionally indicates quantitative measures of relationships between the vehicle and objects in an environment; and
   responsive to determining that the level of similarity indicates that the trajectory parameter is not similar to the validation parameter, provide training data associated with the scenario to a training dataset so that a subsequent parameter of a subsequent trajectory generated by the path planner and associated with the scenario satisfies the level of similarity against the validation parameter and flag the trajectory as being insufficiently similar to the human-based vehicle driving trajectory data,
   wherein the level of similarity is based on one or more predetermined criteria, and the predetermined criteria correspond to one or more driving parameters, the predetermined criteria including at least a legality score that indicates whether the trajectory complies with local laws.

14. The non-transitory computer-readable medium of claim 13, wherein the instructions are further configured to cause the one or more processors to provide training data corresponding to an identified type of scenario, wherein the training data corresponding to the identified type of scenario is utilized to train the path planner to generate the subsequent trajectory.

15. The non-transitory computer-readable medium of claim 13, wherein the validation dataset includes environmental data associated with the one or more scenarios, and the trajectory is generated by the path planner using the environmental data.

16. The non-transitory computer-readable medium of claim 13, wherein the validation dataset is iteratively updated with additional environment data and additional human-based vehicle driving data, the additional human-based vehicle driving data corresponding to observed operations performed by human drivers in a plurality of environments.

17. The non-transitory computer-readable medium of claim 13, wherein the instructions are further configured to cause the one or more processors to identify a subset of the training dataset that corresponds to one or more edge case driving scenarios for which the path planner fails to emulate human driving behavior determined based on human-based vehicle driving data.

\* \* \* \* \*